United States Patent [19]
Wittenbreder, Jr.

[11] Patent Number: 5,402,329
[45] Date of Patent: Mar. 28, 1995

[54] ZERO VOLTAGE SWITCHING PULSE WIDTH MODULATED POWER CONVERTERS

[75] Inventor: Ernest H. Wittenbreder, Jr., 6319 W. Villa Theresa Dr., Glendale, Ariz. 85308-1021

[73] Assignee: Ernest H. Wittenbreder, Jr., Glendale, Ariz.

[21] Appl. No.: 988,438

[22] Filed: Dec. 9, 1992

[51] Int. Cl.⁶ .......................................... H02M 3/335
[52] U.S. Cl. ...................................... 363/16; 363/127
[58] Field of Search ........................... 363/16, 17, 127; H02M 3/335, 3/337

[56] References Cited

U.S. PATENT DOCUMENTS

| | | | |
|---|---|---|---|
| 4,720,668 | 1/1988 | Lee | 323/271 |
| 4,857,822 | 8/1989 | Tabisz | 323/282 |
| 4,860,184 | 8/1989 | Tabisz et al. | 363/17 |
| 4,931,716 | 6/1990 | Jovanovic | 323/285 |
| 5,057,986 | 10/1991 | Henze et al. | 363/20 |
| 5,126,931 | 6/1992 | Jitaru | 363/21 |
| 5,231,563 | 7/1993 | Jitaru | 363/17 |
| 5,235,501 | 10/1993 | Stuart | 363/17 |
| 5,245,520 | 9/1993 | Imbertson | 363/17 |
| 5,274,543 | 12/1993 | Loftus | 363/127 |

OTHER PUBLICATIONS

Andreycak, "Zero Voltage Switching Resonant Power Conversion", Dec. 1990, pp. 1-1 to 1-24, Unitrode Power Supply Design Seminar Manual, SEM 700.

Mammano, "Resonant Mode Converter Topologies", Dec. 1990, pp. 6-1 to 6-6 Unitrode Power Supply Design Seminar Manual, SEM-700.

Jitaru, "Constant Frequency Forward Converter With Resonant Transition", Jun. 1991, pp. 282-292, High Frequency Power Conversion '91 Proceedings.

"Power Transformer Design For Switching Power Supplies"; Jul. 1986; pp. MS-1 to MS-7.

Dixon; "Filter Inductor And Flyback Transformer Design For Switching Power Supplies"; Nov. 1992; pp. M6-1 to M6-6.

Ruble et al.; "Designing Flyback Converters-Part 1: Design Basics"; PCIM, Jan. 1994, pp. 43-47.

"Zero Voltage Switching in High Frequency Power Converters Using Pulse Width Modulation," pp. 1-8, APEC Record, Feb. 1-5, 1988.

*Primary Examiner*—Jeffrey L. Sterrett

[57] ABSTRACT

The power converter of this invention accomplishes zero voltage switching at both turn on and turn off transitions of a primary switch (206). A transformer (218) serves as both energy storage device and isolation mechanism. Inductance (216) placed in series with transformer (218) provides energy to drive the turn on resonant switching transition of switch (206). Additional energy storage is provided by a required primary side filter capacitor (220) and an output filter capacitor (224). During a first operational state in which switch (206) conducts, energy is transferred from power source (202) to transformer (218) and capacitor (220). During the first state, capacitor (224) supports a load (226). During a second operational state, a second primary switch (212) and a secondary switch (234) conduct and energy is transferred from capacitor (220) and transformer (218) to series inductance (216), capacitor (224) and load (226). The resonant transition from the first state to the second state is driven by some combination of stored energy in transformer (218) and inductor (216). The AC magnetizing currents and AC magnetic fields of transformer (218) can be made smaller than the average magnetizing current and the average magnetic field, respectively, and the converter can accomplish zero voltage switching at all line and load conditions.

11 Claims, 21 Drawing Sheets

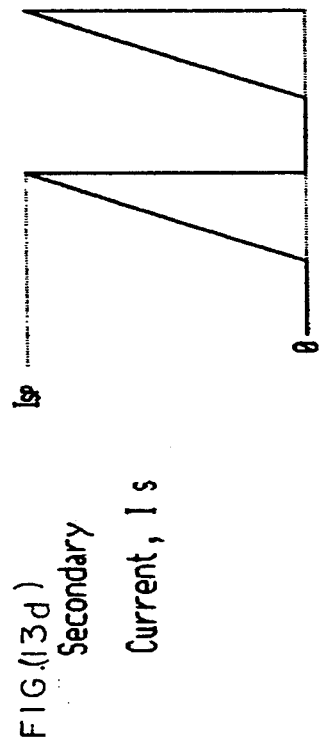
FIG.(13a) Switch Control
FIG.(13b) Primary Current, I P
FIG.(13c) Output Capacitor Current, I sc
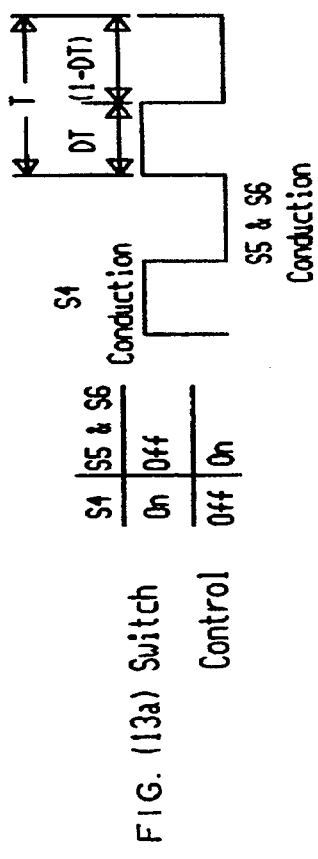
FIG.(13d) Secondary Current, I s
FIG.(13e) Primary Magnetizing Current, I M
FIG.(13f) Reflected Secondary Current, I R

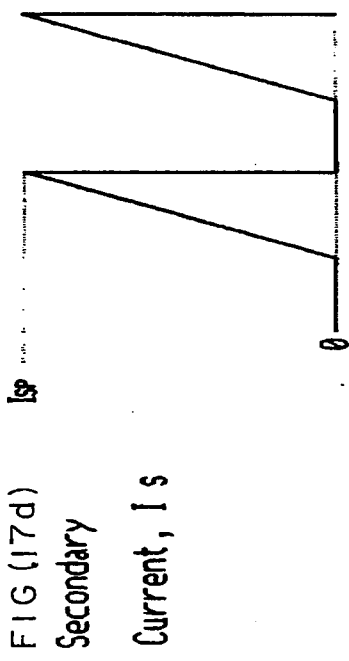
FIG.(17d) Secondary Current, Is
FIG.(17e) Primary Magnetizing Current, IM
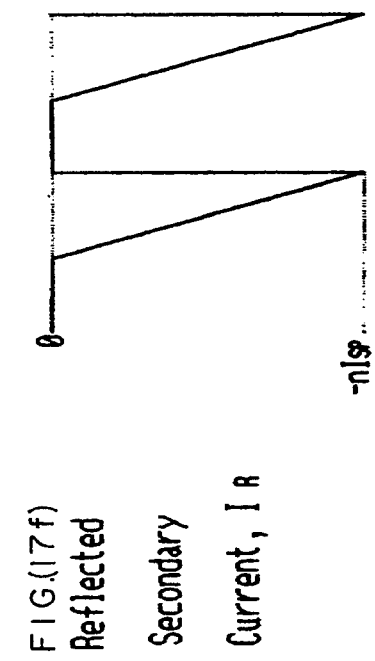
FIG.(17f) Reflected Secondary Current, IR
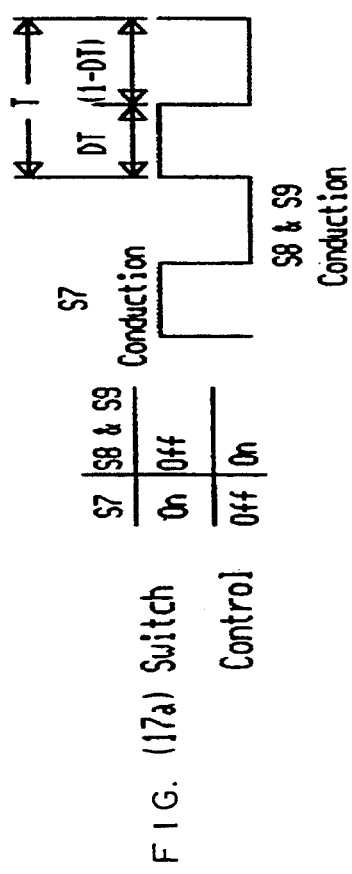
FIG. (17a) Switch Control
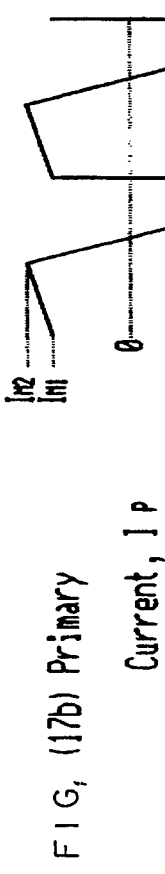
FIG. (17b) Primary Current, IP
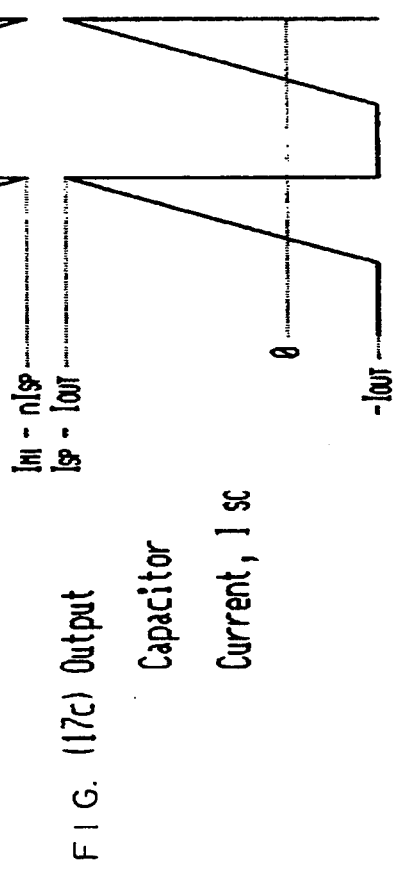
FIG. (17c) Output Capacitor Current, Isc

ZERO VOLTAGE SWITCHING PULSE WIDTH MODULATED POWER CONVERTERS

BACKGROUND OF THE INVENTION

1. Field of the Invention

The subject invention generally pertains to electronic power conversion circuits, and more specifically to high frequency switched mode power electronic converter circuits.

2. Description of Related Art

There are some power conversion circuits which accomplish higher efficiencies by implementing a mechanism that accomplishes switching at zero voltage. Power loss in a switch is the product of the voltage applied across the switch and the current flowing through the switch. In a switching power converter when the switch is in the on state the voltage across the switch is zero so the power loss is zero. When the switch is in the off state the power loss is zero because the current through the switch is zero. During the transition from on to off, and vice versa, power losses can occur, if there is no mechanism to switch at zero voltage or zero current. During the switching transitions, energy losses will occur if there is simultaneously (1) non-zero voltage applied across the switch and (2) non-zero current flowing through the switch. The power losses associated with the switching transitions will be the product of the energy lost per transition and the switching frequency. The power losses that occur because of these transitions are referred to as switching losses by those people who are skilled in the art of switching power converter design. In zero voltage switching converters the zero voltage turn off transition is accomplished by turning off a switch in parallel with a capacitor and a diode. The capacitor maintains the applied voltage at zero across the switch as the current through the switch falls to zero. In the zero voltage transition the current in the switch is transferred to the parallel capacitor as the switch turns off.

The zero voltage turn on transition is accomplished by discharging the parallel capacitor using the energy stored in a magnetic circuit element such as a transformer or inductor and turning on the switch after the parallel diode has begun to conduct. During the turn on transition the voltage across the switch is held at zero clamped by the parallel diode. The various zero voltage switching techniques differ in the control and modulation schemes used to accomplish regulation and in the energy storage mechanisms used to accomplish the zero voltage turn on transition.

One of the techniques uses a resonant circuit which is frequency modulated over a broad frequency range. An example is shown in FIG. 1. These techniques have been refined by a multi-resonant technique in which more resonant circuit elements and a complex control circuit are required but the converter can operate at a fixed frequency.

Several techniques have been introduced which accomplish zero voltage switching inherently at constant switching frequency. One of these techniques requires a full bridge switching arrangement with four primary switches in which the regulation is accomplished by phase modulation. This technique is illustrated in FIG. 2. This technique has several drawbacks including the limited availability of phase modulated integrated control circuits and the large number of parts, which include four primary switches, at least two secondary switches, and at least two large magnetic circuit elements. The technique suffers from an inability to accomplish zero voltage switching at light loads without additional circuit elements and additional complexity.

Another circuit based on the single ended forward converter accomplishes zero voltage switching by addition of an additional primary side switch and capacitor. This technique is illustrated in FIG. 3. This converter's disadvantages are the additional voltage stress on the primary switching elements required to reset the transformer core and a high parts count. The parts required are two large magnetic circuit elements, the transformer and the output filter inductor, two primary switches, a large primary capacitor, and two secondary switching elements.

There is one example of prior art that accomplishes zero voltage switching and a low component parts count. This circuit, shown in FIG. 4, relies on a single magnetic circuit element which accomplishes both magnetic energy storage and isolation. This converter relies on high AC magnetizing fields to accomplish zero voltage switching by requiring that the magnetizing field and the magnetizing current change sign during each cycle. To accomplish zero voltage switching in the circuit of FIG. 4 the peak-to-peak AC magnetizing current must be greater than twice the maximum load DC magnetizing current and the peak-to-peak AC magnetic field must be greater than twice the maximum load DC magnetic field. The high AC magnetizing fields create high core losses at high switching frequencies. The high AC magnetizing currents result in high peak currents and high associated conduction losses. The primary motivations for zero voltage switching are to obtain higher efficiency, higher operating frequencies, smaller component sizes, and higher power densities. Increasing the AC magnetizing currents reduces semiconductor switching losses but increases core and conduction losses. These increased losses impose a limit on the level of power density and efficiency that can be obtained with this approach.

OBJECTS AND ADVANTAGES

An object of the invention is to accomplish zero voltage switching and thereby reduce semiconductor switching power losses.

Another object is to provide an isolated converter which requires no more than one large magnetic circuit element and one additional substantially smaller magnetic circuit element, and a low component parts count.

Another object is to reduce the high magnetic core losses incurred in prior art zero voltage switching power converters.

Another object is to reduce the high conduction losses associated with the high AC magnetizing currents required in some prior art zero voltage switching power converters.

Another object is to provide a simple resonant transition converter design that can be readily used with the single frequency, pulse width modulated, controller integrated circuits.

Another object is to provide a resonant switching transition mechanism which can be designed to provide zero voltage switching over the full range of line voltage and load conditions.

Another object is to provide a resonant switching transition mechanism with one magnetic circuit element, which stores the energy transferred to the load during a switching cycle, and a second substantially smaller magnetic circuit element which stores sufficient energy to drive a resonant transition of the primary switches.

Another object of this invention is to provide a high efficiency zero voltage switching power converter design that can be extended to multiple isolated outputs.

Another object is to provide a circuit topology which, because of its low parts count and simplicity, is useful and practical in a parallel, interleaved, multi-phase converter system design approach.

Another object is to provide a simple, buck derived, zero voltage switching topology with no transformer reset voltage stress.

Further objects and advantages of my invention will become apparent from a consideration of the drawings and ensuing description.

These and other objects of the invention are provided by a novel circuit technique that uses a transformer as both an energy storage device and an isolation mechanism, a primary side energy storage filter capacitor, an output filter capacitor, and inductance in series with the transformer. One of the zero voltage switching transitions is driven by a combination of the magnetic energy stored in the transformer and the magnetizing energy stored in the series inductance. The other zero voltage switching transition is driven by the energy stored in the series inductance. In these converters energy is transferred through a first primary switch from the input line to the transformer, through the intermediate capacitor, and through the series inductance, if the series inductance is placed in the primary circuit. At the same time energy is transferred from the output capacitor to the load. At the end of the on time of the first primary switch, a zero voltage switching transition is accomplished driven by a combination of the magnetic energy stored in the transformer and the energy stored in the series inductance, where the first primary switch turns off and, subsequently, the second primary switch turns on, both switching transitions occurring at zero voltage. Soon after the second primary switch turns on, a switch (or switches) in the transformer's secondary circuit turns on. During the subsequent phase of operation energy is transferred from the primary side energy storage filter capacitor and the transformer to the output capacitor, the series inductance, and the load. The cycle is completed when the second primary switch and the secondary switches turn off at zero voltage and, subsequently, the first primary switch turns on at zero voltage with the resonant switching transition driven by the energy stored in the series inductance.

BRIEF DESCRIPTION OF THE DRAWINGS

The present invention is illustrated by reference to the drawings in which like reference numerals refer to like elements of the invention.

FIGS. 13a through 13f are timing diagrams illustrating the operation of the power converter of FIG. 12.

FIGS. 17a through 17f are timing diagrams illustrating the operation of the power converter of FIG. 16.

Figure 1:
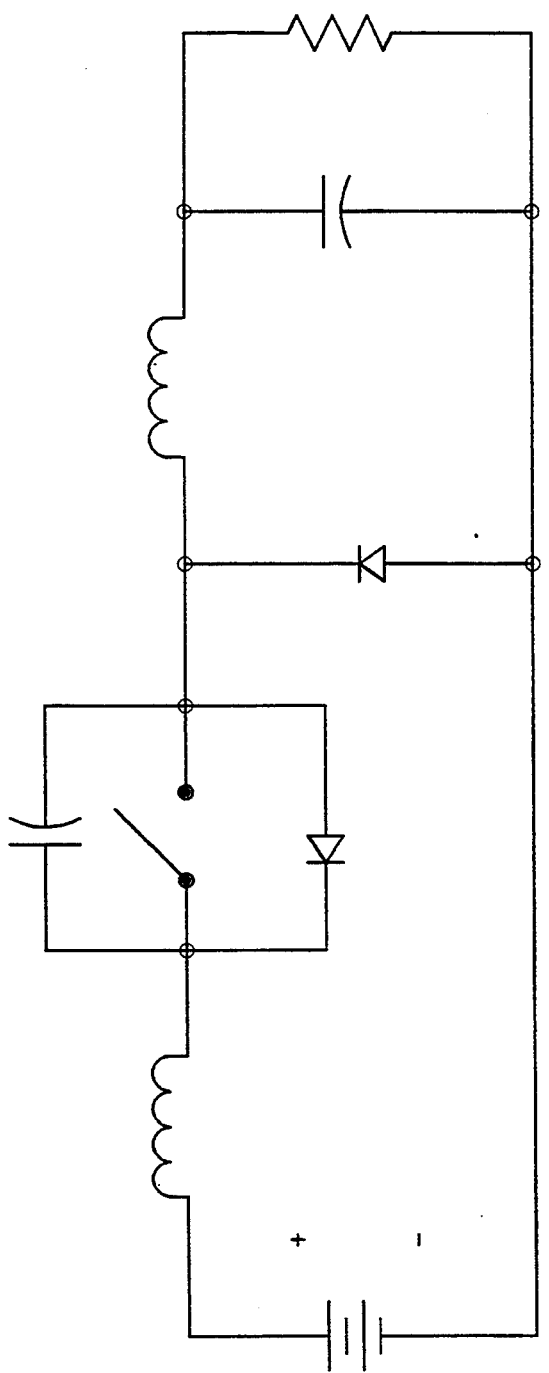
FIG. 1 illustrates a circuit schematic drawing of a frequency modulated, zero voltage switching power converter.
Figure 2:
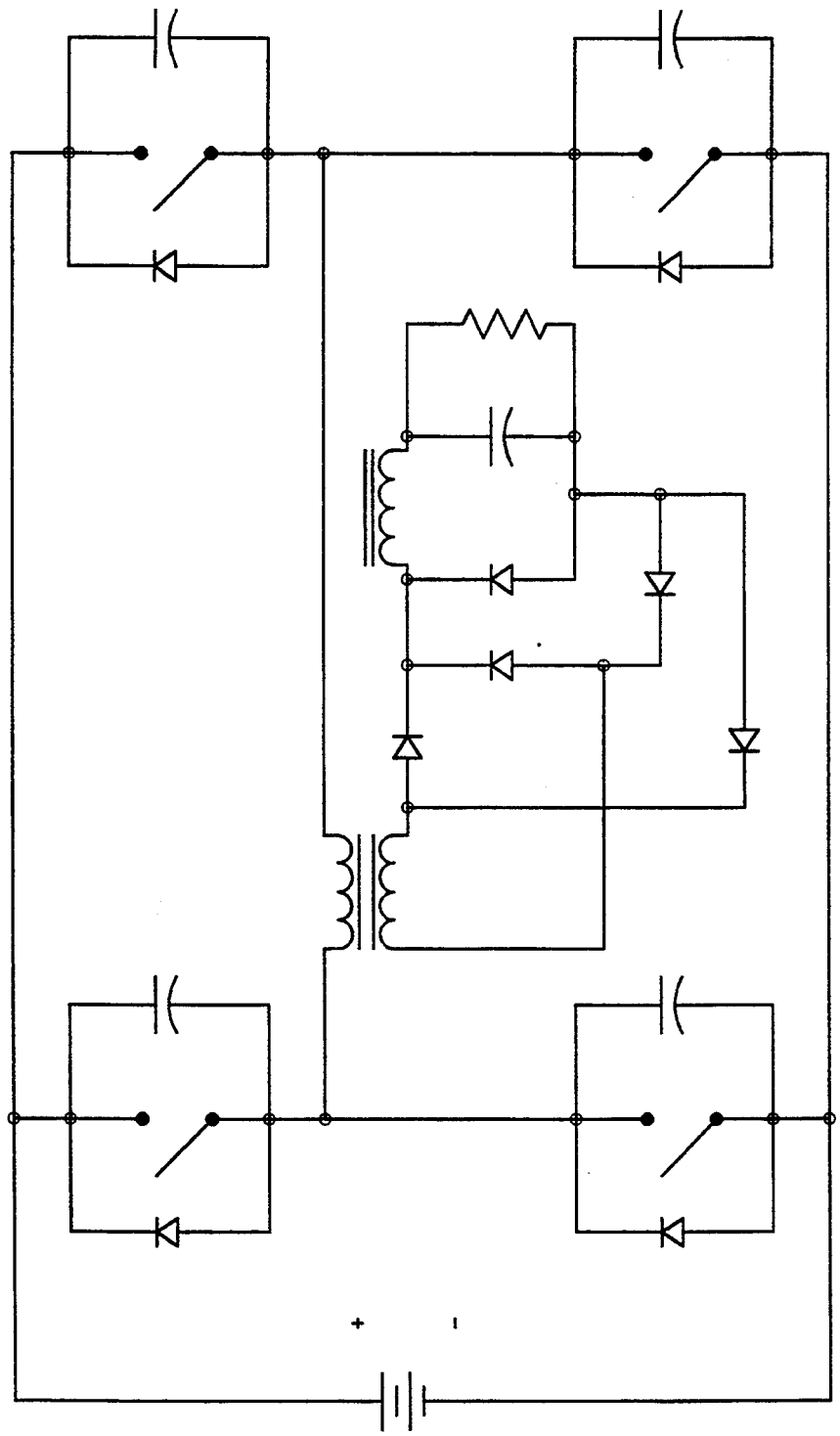
FIG. 2 illustrates a circuit schematic drawing of a phase modulated, full bridge, zero voltage switching, power converter.
Figure 3:
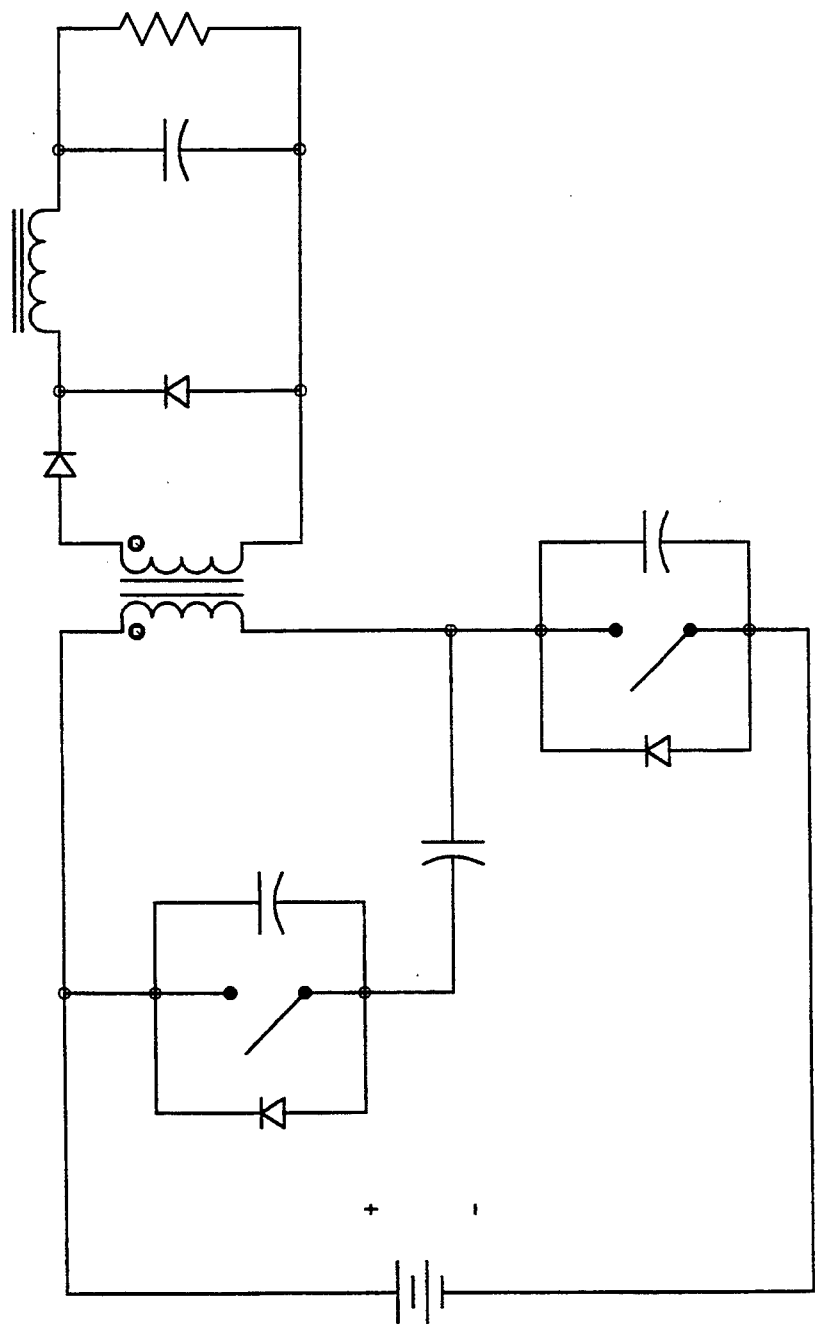
FIG. 3 illustrates a constant frequency, pulse width modulated, zero voltage switching, single ended, forward converter.

| Reference Numerals | | | |
|---|---|---|---|
| 42 | DC input power source | 43 | lead |
| 44 | diode | 45 | node |
| 46 | switch | 47 | input filter capacitor |
| 48 | capacitor | 49 | lead |
| 50 | diode | 51 | node |
| 52 | switch | 53 | node |
| 54 | capacitor | 55 | node |
| 56 | inductor | 57 | lead |
| 58 | transformer | 59 | node |
| 60 | primary filter capacitor | 62 | diode |
| 64 | output filter capacitor | 66 | load |
| 75 | node | 76 | capacitor |
| 78 | node | 82 | DC input power source |
| 84 | diode | 85 | node |
| 86 | switch | 87 | input filter capacitor |
| 88 | capacitor | 90 | diode |
| 91 | node | 92 | switch |
| 94 | capacitor | 96 | inductor |
| 98 | transformer | 99 | node |
| 100 | primary filter capacitor | 102 | diode |
| 104 | output filter capacitor | 106 | load |

-continued

| Reference Numerals | | | |
|---|---|---|---|
| 114 | switch | 115 | node |
| 116 | capacitor | 118 | node |
| 202 | DC input power source | 203 | lead |
| 204 | diode | 205 | node |
| 206 | switch | 207 | input filter capacitor |
| 208 | capacitor | 209 | lead |
| 210 | diode | 211 | node |
| 212 | switch | 213 | node |
| 214 | capacitor | 215 | lead |
| 216 | inductor | 217 | lead |
| 218 | transformer | 219 | node |
| 220 | primary filter capacitor | 222 | diode |
| 224 | output filter capacitor | 226 | load |
| 232 | lead | 234 | switch |
| 235 | node | 236 | capacitor |
| 237 | lead | 238 | node |

SUMMARY

The subject invention uses a pair of primary switches, at least one secondary side switch or rectifier diode, a transformer which is also a magnetic energy storage element, a primary side energy storage and filter capacitor, a secondary side energy storage and filter capacitor placed in parallel with the load, and a small inductance, placed in series with the transformer, to accomplish zero voltage resonant transition switching for the semiconductor switches. The zero voltage switching is accomplished in this converter while maintaining a peak-to-peak magnetic field in the transformer which is less than twice the average full load magnetic field and while maintaining a peak-to-peak magnetizing current in the transformer primary winding which is less than twice the average full load primary magnetizing current.

DESCRIPTION OF THE PREFERRED EMBODIMENTS

Figure 5:
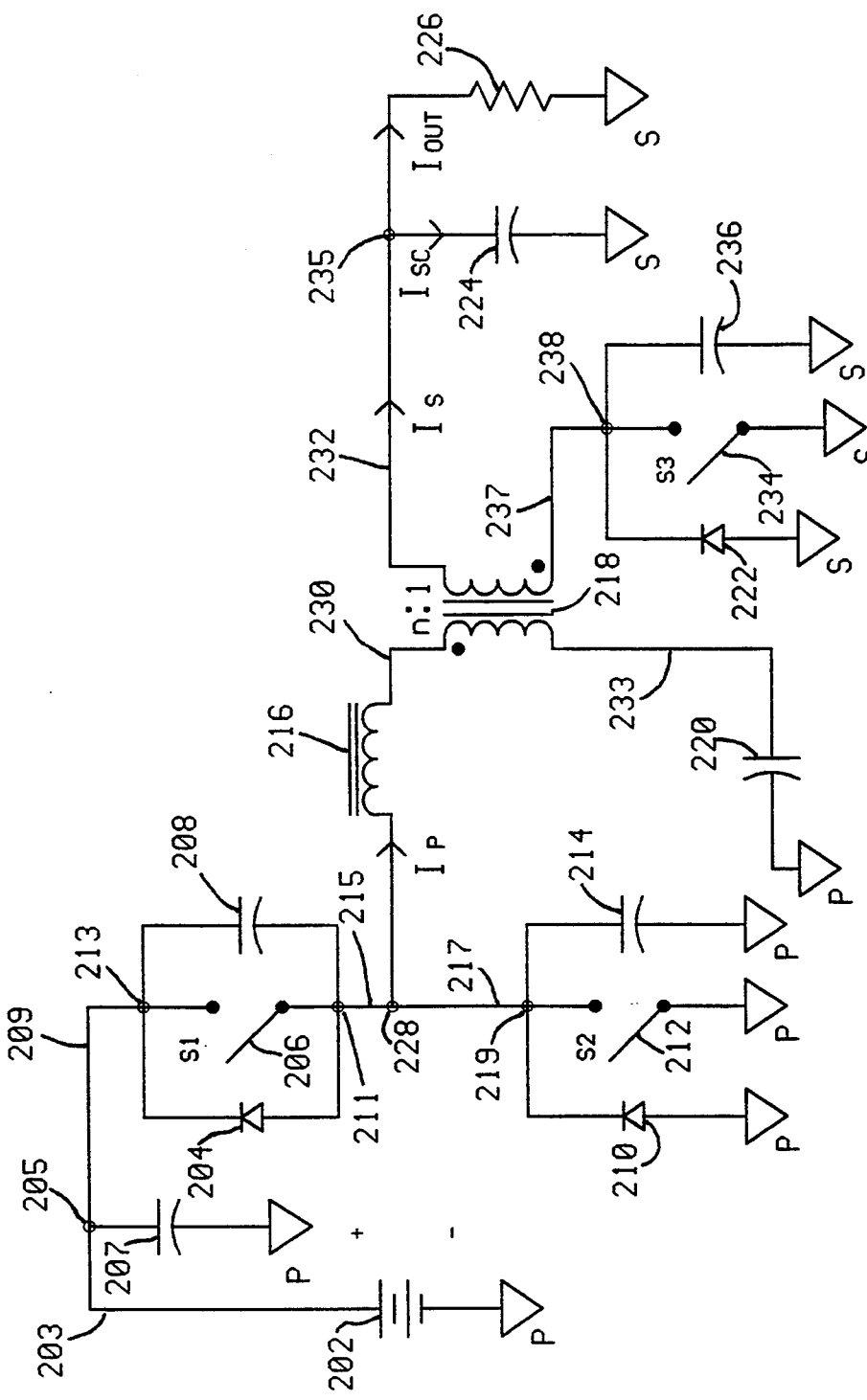
FIG. 5 illustrates a simple, constant frequency, pulse width modulated, zero voltage switching, isolated, buck derived, power converter according to the subject invention.

Referring to FIG. 5, there is shown a series type power processing topology. The circuit employs three power switch subcircuits, a two-winding transformer, an inductor, and primary and secondary side filter capacitors. In the series type topology, the primary side filter capacitor, the primary winding of the transformer, and the inductor are connected in series and then connected to the two primary side power switches which are connected to the input power source. For purposes of the operational state analysis, it is assumed that the filter capacitors are sufficiently large that the voltage developed across the capacitors is approximately constant over a switching interval. It will be assumed that the parasitic capacitors that parallel the switches are small and their effects can be ignored. It will be assumed that the transformer windings are coupled with a coupling coefficient of unity. It will be assumed that the diodes are ideal and have no leakage and no forward voltage drop. It will finally be assumed that the power switches are ideal; that is, lossless and able to carry current in either direction. Moreover it will be recognized by one skilled in the art that, while only a single output version is considered in this analysis, multiples of voltages may be obtained through the addition of windings, switches, diodes, and capacitors operated as herein to be described.

Structure

As shown in the circuit of FIG. 5, a DC input power source 202 is coupled, via a lead 203, to a node 205. A second terminal of DC input power source 202 is connected to a primary ground. Node 205 is connected to an input filter capacitor 207 and to a lead 209 which is connected to a node 213. A second terminal of capacitor 207 is connected to primary ground. Node 213 is connected to a capacitor 208, to a first primary side switch 206, and to a cathode of a diode 204. A second terminal of capacitor 208 is connected to a node 211. Switch 206, diode 204, and capacitor 208 form a first primary switch subcircuit which will, in most cases, be contained in a single device such as a power mosfet. Node 211 is also connected to a second terminal of switch 206 and to an anode of diode 204. Node 211 is also connected to a lead 215 which is connected to a node 228. Node 228 is connected to a magnetic energy storing means or series inductor 216 and to a lead 217. Lead 217 is connected to a node 219. Node 219 is connected to a capacitor 214, to a second primary side switch 212, and to a cathode of a diode 210. An anode of diode 210, a second terminal of switch 212, and a second terminal of capacitor 214 are connected to primary ground. A second terminal of inductor 216 is connected to a lead 230. Lead 230 is connected to a dotted terminal of a primary winding of a first inductive element or transformer 218. A second undotted terminal of the primary winding of transformer 218 is connected to a lead 233. Lead 233 is connected to a primary side filter capacitor 220. A second terminal of capacitor 220 is connected to primary ground. An undotted terminal of a secondary winding of transformer 218 is connected to a lead 232. Lead 232 is connected to a node 235. Node 235 is connected to an output filter capacitor 224 and to a load resistor 226. A node 238 is connected to a cathode of a diode 222, to a secondary side switch 234, to a capacitor 236, and to a lead 237. Lead 237 is connected to a second dotted terminal of the secondary winding of transformer 218. An anode of diode 222, a second terminal of switch 234, a second terminal of capacitor 236, a second terminal of capacitor 224, and a second terminal of load 226 are all connected to a secondary ground. Diode 222, switch 234, and capacitor 236 form a first secondary switch subcircuit which will, in common practice, be a single device. The dots on the primary and secondary windings of transformer 218 indicate the polarity of the windings so that the AC waveforms of the dotted terminals will be in phase with respect to each other and the AC waveforms of the dotted terminals and the undotted terminals will be 180° out of phase or in opposite phase in comparison to each other.

Figure 7:
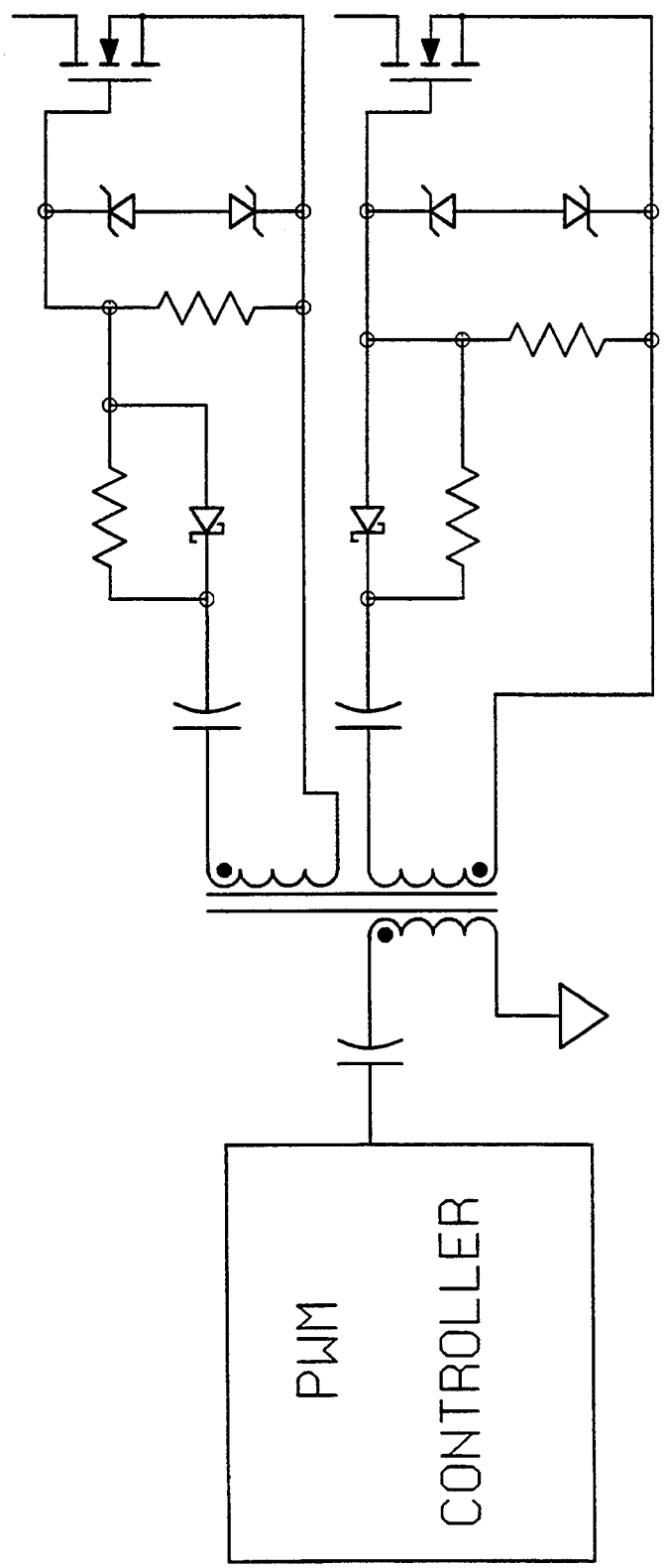
FIG. 7 illustrates a driver circuit for driving power mosfet switches used in the power converter of FIG. 5.

A conventional timing circuit (not shown) controls the duty cycles of switches 206, 212, and 234. The control circuit may be responsive to an external control signal or voltage reference, to an AC component of the DC input power source, to the output voltage, to the output current, to the current supplied by the DC input power source, to other physical parameters which may effect power converter or load operation, or to any combination of these physical parameters. An isolated switch driver circuit, which provides the timing delays necessary to accomplish resonant transition switching by an appropriate selection of resistor values, is shown in FIG. 7.

Operation

In operation switch 212 and switch 234 are turned off simultaneously. The turn on time of switch 234 is delayed with respect to the turn on time of switch 212. The drive signal to switch 206 is inverted with respect to the drive signals of switch 212 and switch 234, except that there are short time intervals, during which the resonant transitions take place, in which the switches are off simultaneously. Break-before-make switching, with a short, but finite, switching interval, which may be of the order of approximately 20 to 200 ns, is adopted in the implementation of zero voltage switching.

Figure 8:
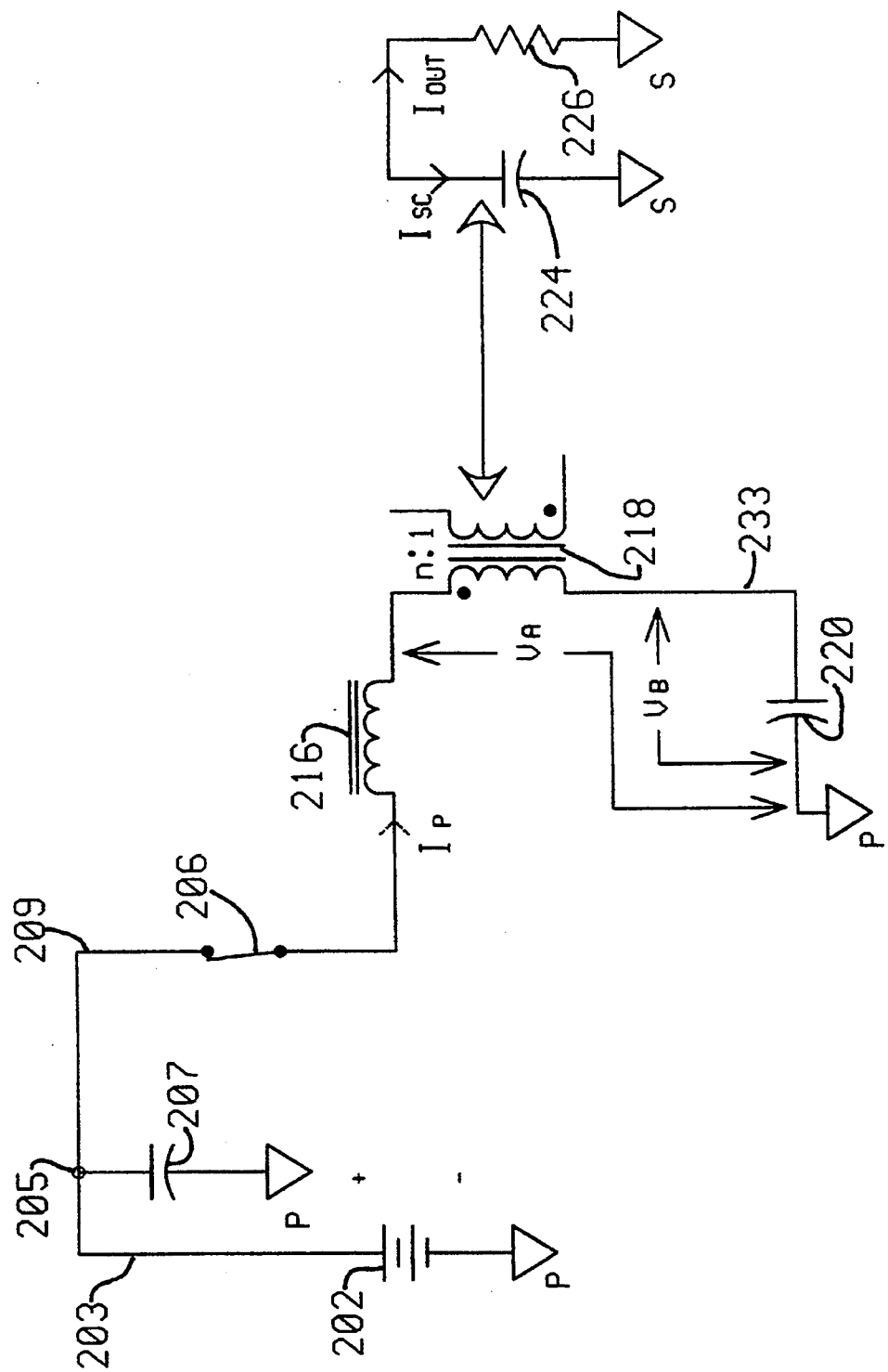
FIG. 8 illustrates the first operating state of the power converter of FIG. 5.
Figure 9:
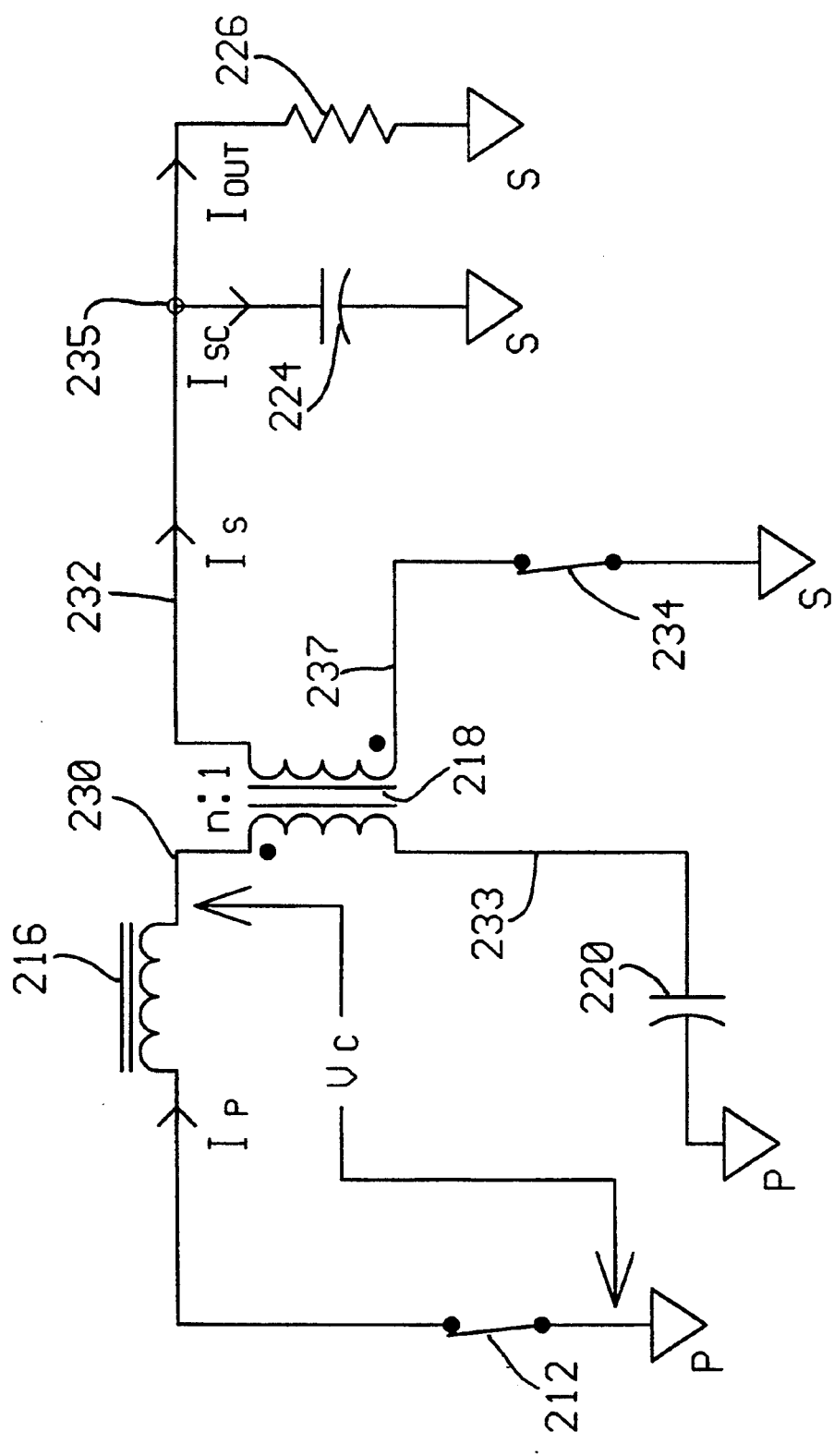
FIG. 9 illustrates the second operating state of the power converter of FIG. 5.

It is assumed in this analysis that the system has reached a settled operating condition. Except for the short, but finite, switching intervals there are two states of the circuit of FIG. 5. It is also assumed, for purpose of analysis, that the switching intervals between the two states are zero and that capacitors 208, 214, and 236 are small and do not contribute significantly to the operation of the converter, except during the switching transitions. The two states are shown in FIGS. 8 and 9. As shown in FIG. 8, during a first state, switch 206 is conducting, allowing the current in inductor 216 and the primary winding of transformer 218 to increase as capacitor 220 charges. During the first state, the output current, $I_{OUT}$, is totally supported by capacitor 224. In the second state, shown in FIG. 9, switch 212 and switch 234 are closed. During the second state the current in inductor 216 and the primary winding of transformer 218 reverses allowing the energy stored in transformer 218 and capacitor 220 to transfer to the secondary side of transformer 218 to charge capacitor 224 and to support load 226.

As defined in FIG. 6a the switch period is T, with a fraction of operation of DT during the conduction period of switch 206, and with a fraction of operation of (1-D)T during the conduction period of the switches 212 and 234. The voltage at the output, $V_{OUT}$, is the product of the load current, $I_{OUT}$, and the load resistance, $R_{LOAD}$, of load 226.

$$V_{OUT} = I_{OUT} R_{LOAD} \tag{1}$$

Consider the condition of zero load current. In the state shown in FIG. 8 the current in the primary increases from $I_{M1}$ to $I_{M2}$. In the state shown in FIG. 9 the magnetizing current in the primary circuit decreases from $I_{M2}$ to $I_{M1}$. From FIG. 8 it can be shown that $$DT(V_{IN}-V_A) = L_I(I_{M2}-I_{M1}) \tag{2}$$

where D is the fractional duty cycle of switch 206, $L_I$ is the inductance of the inductor 216, $V_{IN}$ is the voltage of the DC input power source, and T is the period of the switching cycle.
Similarly from FIG. 9 it can be shown that $$(1-D)T\, V_C = L_I(I_{M2}-I_{M1}) \tag{3}$$

By combining (2) and (3) it can be shown that $$D(V_{IN}-V_A) = (1-D) V_C \tag{4}$$

Since the voltage across the primary winding of transformer 218 must have an average value of zero over one switching period, it can be shown that $$(V_A-V_B)DT - (1-D)T(V_B-V_C) = 0 \tag{5}$$

and by examination of FIG. 9

$$(V_B-V_C) = n\, V_{OUT} \tag{6}$$

then it can be shown that $$V_B = D\, V_{IN} \tag{7}$$

Consider now the condition in which load current exists. During the second state, shown in FIG. 9, the current in the secondary winding of transformer 218 starts at zero and rises linearly as the current in inductor 216 ramps down, reverses sign, and ramps down to a negative peak.

The peak current in the secondary winding of transformer 218, $I_{SP}$, is then $$I_{SP} = \frac{nV_C(1-D)T}{L_I} = \frac{n(V_B - nV_{OUT})(1-D)T}{L_I} = \\ \frac{n(DV_{IN} - nV_{OUT})(1-D)T}{L_I} \tag{8}$$

The average current in the secondary winding of transformer 218 is equal to the load current. It can be shown that $$I_{OUT} = \frac{V_{OUT}}{R_{LOAD}} = \frac{1}{2}(1-D)I_{SP} \tag{9}$$

and $$V_{OUT} = \frac{R_{LOAD}}{2}(1-D)I_{SP} \tag{10}$$
$$= \frac{R_{LOAD}n}{2L_I}(1-D)^2 T(DV_{IN} - nV_{OUT})$$

Solving (10) for $V_{OUT}$ $$V_{OUT} = \left(\frac{\alpha}{\alpha+1}\right)\frac{DV_{IN}}{n} \tag{11}$$

where $$\alpha = \frac{n^2 R_{LOAD}(1-D)^2 T}{2L_I} \tag{12}$$

The output voltage of a buck derived converter is given by the formula $$V_{OUT} = \frac{DV_{IN}}{n}$$

which is a familiar formula to one who is skilled in the art of switched mode power converters. The output voltage for the subject invention differs from that of a buck derived converter by the factor $$\frac{\alpha}{\alpha+1}$$

The output voltage is the same as the buck derived converter for the case that $\alpha \gg 1$.

It is also known that the average current in capacitor 224 must be zero in the steady state. When switch 206 is conducting, capacitor 224 must supply the total load current, $I_{OUT}$. When switches 212 and 234 are conducting, the current in capacitor 224 decreases, then reverses, and increases in the opposite direction from which it was conducting during the on state of switch 206. During the off state of switch 206 the charge that was lost to the load during the on state of switch 206 is replaced. The wave shape of the current in capacitor 224, during the off state of switch 206, is that of a linear ramp, as shown in FIG. 6c. When switch 206 is conducting, the current in capacitor 224, $I_{SC}$, is equal and opposite to the output current, $I_{OUT}$.

$$I_{SC} = -I_{OUT}$$

During the off state of switch 6 the current in capacitor 224 is equal to the difference between the current in the secondary winding, $I_S$, and the output current, $I_{OUT}$, thus:

$$I_{SC} = I_S - I_{OUT}$$

The current in the secondary winding of transformer 218 is found from (8) to be $$I_S(t) = n \left[ \frac{DV_{IN} - nV_{OUT}}{L_I} \right] (t - DT) \tag{13}$$

and the current in capacitor 224 is then $$\begin{aligned} I_{SC}(t) &= n \left[ \frac{DV_{IN} - nV_{OUT}}{L_I} \right] (t - DT) - I_{OUT} \\ &= n \left[ \frac{DV_{IN} - nV_{OUT}}{L_I} \right] (t - DT) - \frac{V_{OUT}}{R_{LOAD}} \end{aligned} \tag{14}$$

The current in capacitor 224 is shown in FIG. 6c. The current, $I_S$, through the secondary winding of transformer 218, is shown in FIG. 6d.

By linear superposition the current in the primary winding of transformer 218 is comprised of two components. The first component is the magnetizing current which is linearly related to the magnetic field in the core of transformer 218. Because of the presence of an air gap, either lumped or distributed through the core, the magnetizing current will also be substantially proportional to the field of magnetic induction in the core of transformer 218.

The second component of the current in the primary winding of transformer 218 is the reflected secondary current which occurs only when switch 206 is in the off state and when switches 212 and 234 are conducting.

The magnetizing current has two components which are linearly superimposed to form the total magnetizing current. One component, $I_{MDC}$, is a DC component and depends on the average load current, $I_{OUT}$, and transformer 218 turns ratio, n. The second component, $I_{MAC}$ is an AC component with an average value of zero and a peak-to-peak value which depends on the magnetizing inductance of the primary winding of transformer 218, $L_P$, the DC input voltage, $V_{IN}$, the switching period, T, the duty cycle, D, of switch 206, and the inductance of inductor 216, $L_I$.

The DC component of the magnetizing current in the primary winding of transformer 218 is simply $$I_{MDC} = \frac{I_{OUT}}{n} \tag{15}$$

The total magnetizing current in the primary winding of transformer 218 will have an initial value of $I_{M1}$ at the instant that switch 206 closes. This magnetizing current will increase linearly, while switch 206 remains closed, according to the equation $$I_{MP}(t) = I_{M1} + \frac{(V_A - V_B)}{L_P} t \tag{16}$$

Also $$I_{MP}(t) = I_{M1} + \frac{V_{IN} - V_A}{L_I} t \tag{17}$$

since inductor 216 is in series with the primary winding of transformer 218. In (16) and (17) t=0 at the instant of switch 206 closure.

The current at the end of the on interval of switch 206 is $I_{M2}$ and $$I_{M2} = I_{M1} + \frac{V_A - V_B}{L_P} DT = I_{M1} + \frac{V_{IN} - V_A}{L_I} DT \tag{18}$$

The average value of this magnetizing current is $$I_{MDC} = \frac{1}{2}(I_{M1} + I_{M2}) = \frac{I_{OUT}}{n} \tag{19}$$

From (18) it can be shown that $$V_A = \frac{V_{IN}L_P + V_B L_I}{L_I + L_P} = V_{IN}\frac{L_P + DL_I}{L_I + L_P} \tag{20}$$

Substituting (20) in (18) one obtains $$I_{M2} = I_{M1} + \frac{V_{IN}}{L_P + L_I} D(1 - D)T \tag{21}$$

From (21) the peak-to-peak AC magnetizing current in the primary winding of transformer 218 is shown to be $$I_{M2} - I_{M1} = \frac{V_{IN}}{L_P + L_I} D(1 - D)T \tag{22}$$

Figure 4:
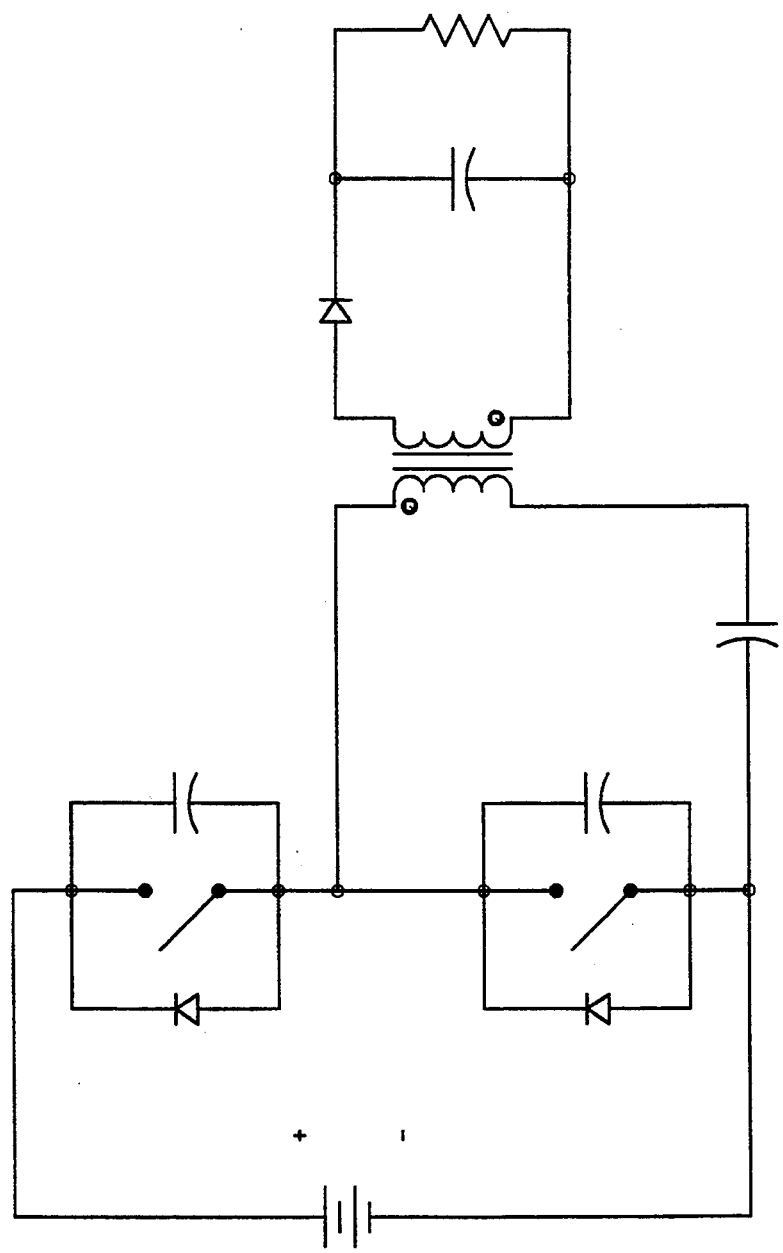
FIG. 4 illustrates a simple, constant frequency, pulse width modulated, zero voltage switching, isolated, buck derived, power converter with high magnetic core losses and high conduction losses.

From (22) it can be seen that the peak-to-peak AC magnetizing current in the primary winding of transformer 218 does not depend on the load current. When the load current is zero the average value of the primary magnetizing current will be zero from (15) so that at no load $I_{M2}$ is positive and $I_{M1}$ is negative an equal amount, so that $I_{M1} = -I_{M2}$ at no load. At maximum load, $I_{MDC}$ is a maximum and, in order to avoid high conduction losses due to high peak magnetizing current, or high $I_{M2}$, and to avoid high magnetic core losses due to high peak-to-peak magnetic fields, $I_{M2} - I_{M1}$ can be made to be less than two times $I_{MDC}$. This is a distinct difference between the subject invention and the prior art example illustrated in FIG. 4, which requires that $I_{M2} - I_{M1} > 2I_{MDC}$ in order to accomplish zero voltage switching at maximum load current at both state transitions. This also represents a substantial, distinct, and novel advantage over the prior art.

During the off time of switch 206 the magnetizing current in the primary winding decreases since the voltage applied to the winding is now reversed. The magnetizing current during this interval is $$I_{MP}(t) = I_{M2} - \frac{V_B - V_C}{L_P}(t - DT) \qquad (23)$$

$$= I_{M2} - \frac{V_C}{L_I}(t - DT)$$

At t=T the magnetizing current has returned to its original value, $I_{M1}$, and from equation (23)

$$I_{M1} = I_{M2} - \frac{V_B - V_C}{L_P}(1 - D)T \qquad (24)$$

$$= I_{M2} - \frac{V_C}{L_I}(1 - D)T$$

From (23) or (24) $V_C$ is found to be $$V_C = \frac{DV_{IN}L_I}{L_I + L_P} \qquad (25)$$

and $$I_{MP}(t) = I_{M2} - \frac{DV_{IN}}{L_I + L_P}(t - DT) \qquad (26)$$

During the on time of switch 206 the only current flowing in the primary circuit is the magnetizing current of transformer 218 which has been described above. During the off time of switch 206 in addition to the magnetizing current a reflected load current flows in the primary winding of transformer 218. As discussed above the secondary current in transformer 218 is a ramp which starts at zero and has a peak value given by (8). The reflected load current that flows in the primary winding flows in a direction opposite to the direction of the average magnetizing current.

The current in the secondary was given in (13). The reflected secondary current, $I_R$, differs by the turns ratio, n, of transformer 218 from the secondary current and can be shown to be $$I_R(t) = -\frac{I_S(t)}{n} = -\frac{DV_{IN} - nV_{OUT}}{L_I}(t - DT) \qquad (27)$$

The current reflected from the secondary winding into the primary winding of transformer 218 is shown in FIG. 6f.

During the off time of switch 206 the total current in the primary winding of transformer 218 is $$I_P(t) = I_{MP}(t) + I_R(t) \qquad (28)$$

$$= I_{M2} - \left[\frac{DV_{IN}}{L_I + L_P} + \frac{DV_{IN} - nV_{OUT}}{L_I}\right](t - DT)$$

The total primary current is shown in FIG. 6b.

As shown in FIG. 6e the primary magnetizing current is a triangular shape which remains positive and close to the level of the DC magnetizing current at maximum load. A benefit associated with comparably small peak-to-peak AC magnetizing current is that conduction losses associated with circuit parasitics are reduced by maintaining a comparably small peak-to-peak AC magnetizing current. If, for example, the peak-to-peak AC magnetizing current were twice the maximum DC magnetizing current, which is the requirement for zero voltage switching in the example of prior art shown in FIG. 4, then the peak conduction losses, given by $I^2R$, is approximately four times larger than the case in which the peak-to-peak magnetizing current is a fraction of the maximum DC magnetizing current and the average conduction losses are approximately twice as large as the case in which the peak-to-peak magnetizing current is a fraction of the maximum DC magnetizing current. These effects of comparably higher peak currents are well known to one skilled in the art of power converter design. In the case of comparably lower AC magnetizing current when the load current is removed or largely reduced the conduction losses are also substantially reduced. In the case of comparably higher AC magnetizing currents this is not the case. For the case sited of comparably high AC magnetizing current, if the load is changed from maximum load to zero load, the conduction losses will only drop by a factor of approximately 2.

Another advantage of comparably lower AC magnetizing currents is that the magnetizing fields in the core of transformer 218 are also comparably lower. Lower AC magnetic fields have significant advantages over higher AC magnetic fields because the magnetic core losses are highly dependent on the magnitude of the AC magnetic fields in the magnetic core. For a power ferrite core $$P\alpha B^\beta \qquad (29)$$

where P is the core loss, B is the root-mean-square value of the AC magnetic induction in the subject core and $\beta$ is a constant which is approximately 2.5, for high frequency, power, ferrite materials used in high frequency, power transformers and inductors. A higher AC magnetic field will also significantly lower the maximum DC magnetic field which can be used. In the case where the peak-to-peak AC magnetizing current is more than double the DC magnetizing current, the DC magnetic field must be maintained at a level which is less than half of the saturated field of the core material. This is because of the high AC magnetic field excursions that push the magnetic fields toward saturation when the DC magnetizing fields are about half the saturated magnetic field. Operation at or very near the saturation limit must be avoided because operating at or above the saturation limit may have potentially disastrous effects on converter reliability if saturation is not a normal and intended operating condition. The saturation limit is temperature dependent. Design margins are established so that saturation does not occur at the highest temperature extreme where the saturation level is the lowest.

In order to accomplish low AC magnetizing current in the windings of transformer 218 the inductance, $L_P$, of the primary winding should be chosen sufficiently large to achieve the low level of core and conduction losses desired. Based on equation (22) it can be seen that the AC magnetizing current depends on $L_I$ equally as it depends on $L_P$, so that, alternatively, $L_I$ can be chosen to be large in order to accomplish small AC magnetizing current. For other considerations, as will be later explained, $L_I$ is chosen to be small in comparison to $L_P$ so that there will be little dependence of AC magnetizing current on $L_I$. To one skilled in the art of magnetic circuit element design one important criteria for selecting a core size at high switching frequency is the hot spot temperature of the magnetic circuit element, which is the maximum temperature inside the magnetic circuit element and depends on both core and conduction losses. At much lower switching frequencies or for the case in which the AC magnetic fields are small and where DC conduction losses dominate, the design of transformer 218 and core selection is based on the saturation limit of the core's magnetic material. Since transformer 218 both transfers energy and also serves as a magnetic energy storage device, the design of transformer 218 follows the same guidelines as the design of a so called continuous or incomplete energy transfer flyback transformer to one skilled in the art of magnetic circuit element design.

Consider now the switching transitions. The switching transitions refer to the two time intervals when the power converter of FIG. 5 changes from one operating state to the other operating state. A first transition is the transition in which switch 206 is initially on and switches 212 and 234 are initially off and the converter changes to the state in which switch 206 is finally off and switches 212 and 234 are finally on. A second transition is the transition in which switch 206 is initially off and switches 212 and 234 are initially on and the converter changes to the state in which switch 206 is finally on and switches 212 and 234 are finally off.

At the beginning of the first transition, the voltage applied to capacitor 208 is approximately zero because switch 206 is on. The transition begins when switch 206 turns off. Capacitor 208 maintains the voltage across switch 206 at approximately zero while switch 206 turns off. The current flowing in switch 206 is transferred to capacitor 208 and the voltage applied across capacitor 208 begins to rise, driven by a combination of energy stored in transformer 218 and energy stored in inductor 216.

At the same time that the voltage is rising in capacitor 208, the voltage in capacitor 214 is falling, driven by the same stored magnetic energy that drives the charging of capacitor 208.

The voltage across capacitor 208 continues to rise until the voltage across capacitor 208 exceeds the voltage of the DC input power source and diode 210 begins to conduct. At this time the voltage applied across capacitor 214 is approximately zero and switch 212 is turned on. During this transition the primary current decreases and, simultaneously, the secondary current increases discharging the capacitor 236 into capacitor 224 and load 226. As the voltage measured across capacitor 236 falls below zero, diode 222 begins to conduct. Switch 234 then turns on at approximately zero volts and the first transition is complete.

The second transition begins when switches 212 and 234 turn off, both at the same time. Because the applied voltages on capacitors 214 and 236 are approximately zero, the turn off of switches 212 and 234 is accomplished at approximately zero voltage. At the beginning of the second transition, current flows from primary side filter capacitor 220, through the primary winding of transformer 218, through inductor 216, and through switch 212 to ground. The direction of this current, during the second transition, is reversed by comparison to the current flowing through these same primary circuit components at the end of the first transition. Because of the energy stored in inductor 216, the voltage applied across capacitor 214 will rise and the voltage applied across capacitor 208 will fall until the voltage across capacitor 208 drops to zero and the voltage across capacitor 214 rises to the level of the voltage of source 202, at which time diode 204 begins to conduct. Subsequent to diode 204 conduction switch 206 is turned on at zero voltage and the second transition is complete.

During the second transition, the stored energy in transformer 218 will, in general, oppose a zero voltage transition, since the magnetizing current and magnetizing fields have not reversed sign during the second operational state, but inductor 216 forces the reflected load current to flow in the primary winding of transformer 218, and this reflected current and the energy associated with this reflected current stored in inductor 216 drive the second switching transition. The mechanisms for driving the second transition is different than the mechanism driving the first transition. This fact separates this invention from all of the prior art and gives this invention distinct advantages over the prior art by not requiring that the magnetizing fields and magnetizing currents in transformer 218 reverse polarity during each switching cycle.

During the second transition the current in inductor 216 will decrease and the current in transformer 218 will decrease in both the primary and secondary windings. The stored magnetic energy in inductor 216 drives the second transition. In order to guarantee that switch 206 will turn on at zero voltage at the end of the second transition, there must be sufficient stored energy in inductor 216 to drive the transition and charge and discharge capacitors 214 and 208, respectively. Any excess stored energy in inductor 216 is returned to source 202 and load 226. The condition of sufficiency for accomplishing zero voltage switching at both transitions is that the minimum stored magnetic energy in inductor 216 must be greater than or equal to the energy transferred to capacitor 214 and capacitor 208 during the second transition.

The stored energy in inductor 216, $E_M$, is $$E_M = \frac{1}{2} L_I I_{PF}^2 \tag{30}$$

where $I_{PF}$ is the final primary current at the end of the on time of switch 212.

$I_{PF}$ can be found from (22) and (28) to be $$I_{PF} = I_{M1} - T(1 - D)\left[\frac{DV_{IN} - nV_{OUT}}{L_I}\right] \tag{31}$$

The energy, $E_C$, delivered to capacitor 208 and capacitor 214 is $$E_C = \frac{1}{2} C_{208} V_{IN}^2 + \frac{1}{2} C_{214} V_{IN}^2 \tag{32}$$

where $C_{208}$ is the capacitance of capacitor 208 and $C_{214}$, is the capacitance of capacitor 214.

The criteria for zero voltage switching is that $$E_M > E_C \tag{33}$$

This condition should be applied at maximum line voltage and the worst case load condition. The worst case load condition is either the minimum load or the load for which $I_{M1} = 0$, whichever is larger, where $I_{M1}$ is the minimum primary magnetizing current of transformer 218. At higher load currents more energy will be stored in inductor 216 to drive the second transition. At currents lower than those corresponding to $I_{M1} = 0$ the stored magnetic energy in transformer 218 contributes to the energy required to drive the transition. If the converter's minimum load is greater than the load corresponding to $I_{M1}=0$ then, in this case, the minimum load represents the worst case condition. The DC magnetizing current corresponding to $I_{M1}=0$ is equal to one half the peak-to-peak AC magnetizing current given by equation (22).

Let $I_{CRITICAL}$ be the larger of one half the peak-to-peak magnetizing current and the minimum reflected load current, which is the minimum load current divided by the transformer turns ratio, n. Let $C_{PARA}$ be the sum of parasitic capacitances including $C_{208}$ and $C_{214}$ which represents the sum of the parasitic capacitances that must be charged or discharged during a switching transition. Let $V_{MAX}$ be the maximum voltage change of the parasitic capacitors. In this case $V_{MAX}$ is the maximum line voltage or the maximum voltage of source 202. Then it can be shown that $$L_{IMIN} = C_{PARA}\left[\frac{V_{MAX}}{I_{CRITICAL}}\right]^2 \quad (34)$$

where $L_{IMIN}$ is the minimum value of the inductance of inductor 216 necessary to accomplish zero voltage switching under worst case conditions. Since the criteria for selecting the inductance value for inductor 216 is determined at either the minimum load current or the load current corresponding to the one half the peak-to-peak AC magnetizing current in the primary winding of transformer 218, the value of the inductance of inductor 216 will be larger than the value that is required to accomplish zero voltage switching at the maximum load current.

In addition to the beneficial effect of providing a zero voltage switching mechanism, another effect of series inductor 216 is an inherent limitation in power frequency product due to the ramping of the secondary current as shown in FIG. 6d. For a fixed period and a fixed value series inductor there is a maximum peak secondary current. As the frequency increases and the switching period decreases the peak current and power output decrease proportionately. The inductance of inductor 216 is a series impedance in the main path of power flow from DC input power source to load 226. A larger value of $L_I$ dictates a smaller value of the transformer 218 turns ratio, n. Reducing n will increase the voltage stress on the secondary switch 234. A larger value of $L_I$ also implies greater cost, size, and weight.

There are two alternatives that increase the load range without decreasing the turns ratio of transformer 218, n. The alternatives are (1) to use a so called swinging choke for inductor 216 or (2) to use a core in inductor 216 that saturates at an energy level slightly higher than the energy required to drive the turn on resonant transition of switch 206 under worst case conditions. These two alternatives are similar and both amount to significantly decreasing the inductance of inductor 216 after the required minimum energy necessary to drive the resonant transition under worst case conditions is stored in inductor 216. These approaches can be accomplished with a core that will be smaller, lighter, and less expensive compared to a fixed inductance value for inductor 216.

A swinging choke is an inductor made using a composite core. Composite cores can be purchased from several manufacturers including Magnetics, Inc., and Micrometals. The designer can fabricate a composite core by stacking two cores, with the same inside and outside diameters, within the same winding. The two stacked cores will have different permeabilities and saturation levels with one core having a lower permeability and higher saturation level than the other core. Alternatively the same results can be obtained by placing two inductors in series. A first inductor of the series combination will satisfy all the criteria stated above for $L_I$ but will saturate at a current in the range of approximately 1% to 10% higher than $I_{CRITICAL}$. A second inductor will have an inductance which is in the range of approximately 1% to 20% of the first inductor depending on the load range variation but does not saturate at the maximum peak current in the primary winding of the transformer 218. The leakage inductance of transformer 218 can substitute for the second inductor in some cases.

Figure 6:
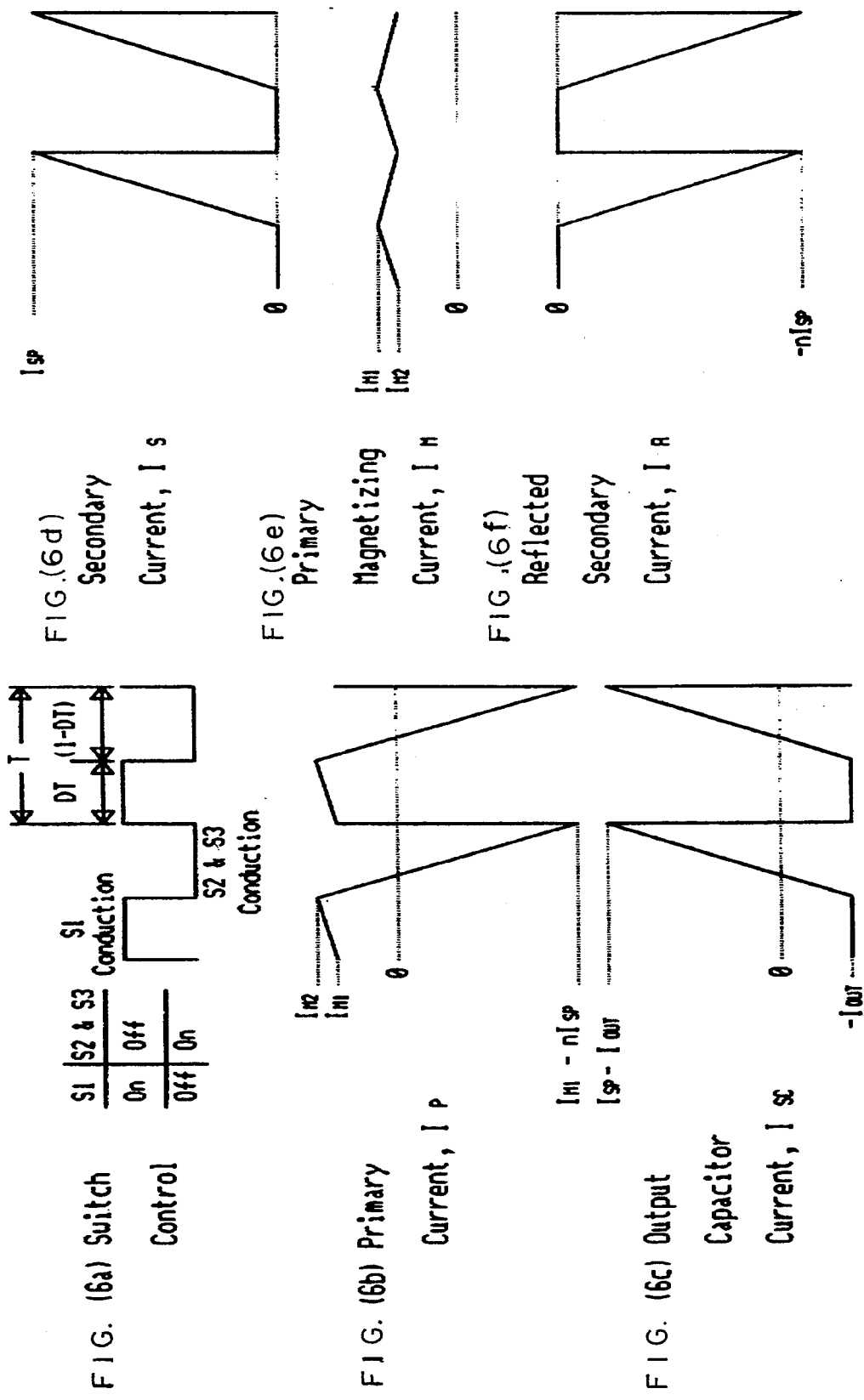
FIGS. 6a through 6f are timing diagrams illustrating the operation of the power converter of FIG. 5.

The use of a swinging or saturating choke will have an effect on the current waveforms shown in FIGS. 6 b, c, d, and f. The slope of the current ramps will initially have a smaller slope. When the current reaches a value slightly greater than $I_{CRITICAL}$ then the inductance of inductor 216 will drop and the slope of the current ramps will correspondingly increase.

For the case in which the minimum load current is less than $$\frac{1}{2} \frac{V_{IN}D(1-D)T}{L_I + L_P}$$

or one half the peak-to-peak AC magnetizing current in the primary winding of transformer 218, then $I_{CRITICAL}$ is one half the peak-to-peak AC magnetizing current. By increasing the AC magnetizing current $L_I$ can be decreased and the load range enhanced. By increasing the AC magnetizing current to the point where the peak-to-peak magnetizing current is more than twice the maximum DC magnetizing current at full load the value of $L_I$ required to drive the resonant transition becomes zero. This is the extreme case and it generally results in unacceptably high core and conduction losses as explained earlier. The point intended to be made here is that there is a trade off between (1) the value of $L_I$ required to accomplish zero voltage switching under worst case conditions and (2) peak-to-peak AC magnetizing current. Since the transformer 218 is a DC energy storage device in this application, it may be limited by magnetic saturation. In this case the core losses are generally smaller than the conduction losses and the hot spot temperature in the core is generally less than the maximum hot spot temperature that can be tolerated. In this case, the AC magnetic fields can be increased by lowering the inductance of the primary winding of transformer 218, so that the value of $L_I$ required to accomplish zero voltage switching is reduced. In this case, the core losses can be increased to a point where they are close in value, approximately 40% to 250%, to the conduction losses. The benefits of the increase in core loss are smaller values of inductance and smaller sizes for inductor 216 and transformer 218. There is a trade off that the designer must make in achieving his specific goals for power density and converter efficiency. In some cases the AC magnetizing current can be increased and a smaller core for transformer 218 realized without significantly reducing the converter's efficiency.

There is another consideration that has an impact on the stored energy in inductor 216. At the end of the second transition, switch 206 is turned on at zero voltage. During the second transition the stored energy in inductor 216 drives the resonant transition while both the current in the primary winding of transformer 218 and the current in the secondary winding of transformer 218 rapidly decrease in magnitude. Switch 206 will be turned on before the secondary current has fallen to zero. At the time switch 206 turns on, the voltage applied across capacitor 236 remains near zero while diode 222 conducts current. When the current in the secondary winding of transformer 218 reaches zero the voltage across capacitor 236 is zero. The voltage across capacitor 236 subsequently rises as the current in the secondary winding reverses. The voltage on capacitor 236 will rise and reach a peak value of $$V_{236} = V_{OUT} + \frac{V_A - V_B}{n}$$

where $V_A$ and $V_B$ were defined earlier and illustrated in FIG. 8.

During the first transition the dotted termination of transformer 98 will remain near $V_A$ while the stored energy in inductor 216 drives the resonant transition. The dotted terminal of the primary winding is held near $V_A$ by the fact that there is initially zero secondary current in transformer 218 at the start of the first transition and the voltage on capacitor 236 cannot discharge unless current exists in the secondary circuit to discharge capacitor 236. Consequently a voltage nearly equal to but slightly less than $V_A$ is impressed across inductor 216 at the end of the first transition when switch 212 turns on. The result of this large voltage impressed across inductor 216 is that its current changes rapidly as the voltage across capacitor 236 falls. By considering the effect of the parasitic capacitances, it can be seen that the current in the secondary circuit increases much more rapidly at the beginning of the second state, illustrated in FIG. 9, than the rate at which that current increased, as indicated by the analysis, which neglected the effects of the parasitics. Effectively the energy stored in capacitor 236 during the first state is transferred to inductor 216 at the beginning of the second state.

Another factor, which limits the upper bound of switching frequency, is the finite time to complete the resonant transitions, which reduces the effective duty cycle of switch 206. The resonant transition time is reduced by storing more energy in inductor 216 than the minimum amount of energy required to drive the resonant transition. This limitation is shared by all resonant transition converters.

Capacitors 208, 214, and 236 and diodes 204, 210, and 222 are not required in the subject invention, if power mosfets are used for switches 206, 212, and 234. The inherent drain source capacitances of the power mosfets substitute for capacitors 208, 214, and 236. The integral body drain diode of the power mosfets obviate diodes 204, 210, and 222. Because of these advantages of power mosfets, because of the advantage of the high switching speed of power mosfets, and because power mosfets have the property of permitting bidirectional current flow required for amplifier applications, power mosfets are considered to be the preferred type of switches for use in the circuits presented here.

Related Embodiments

Figure 10:
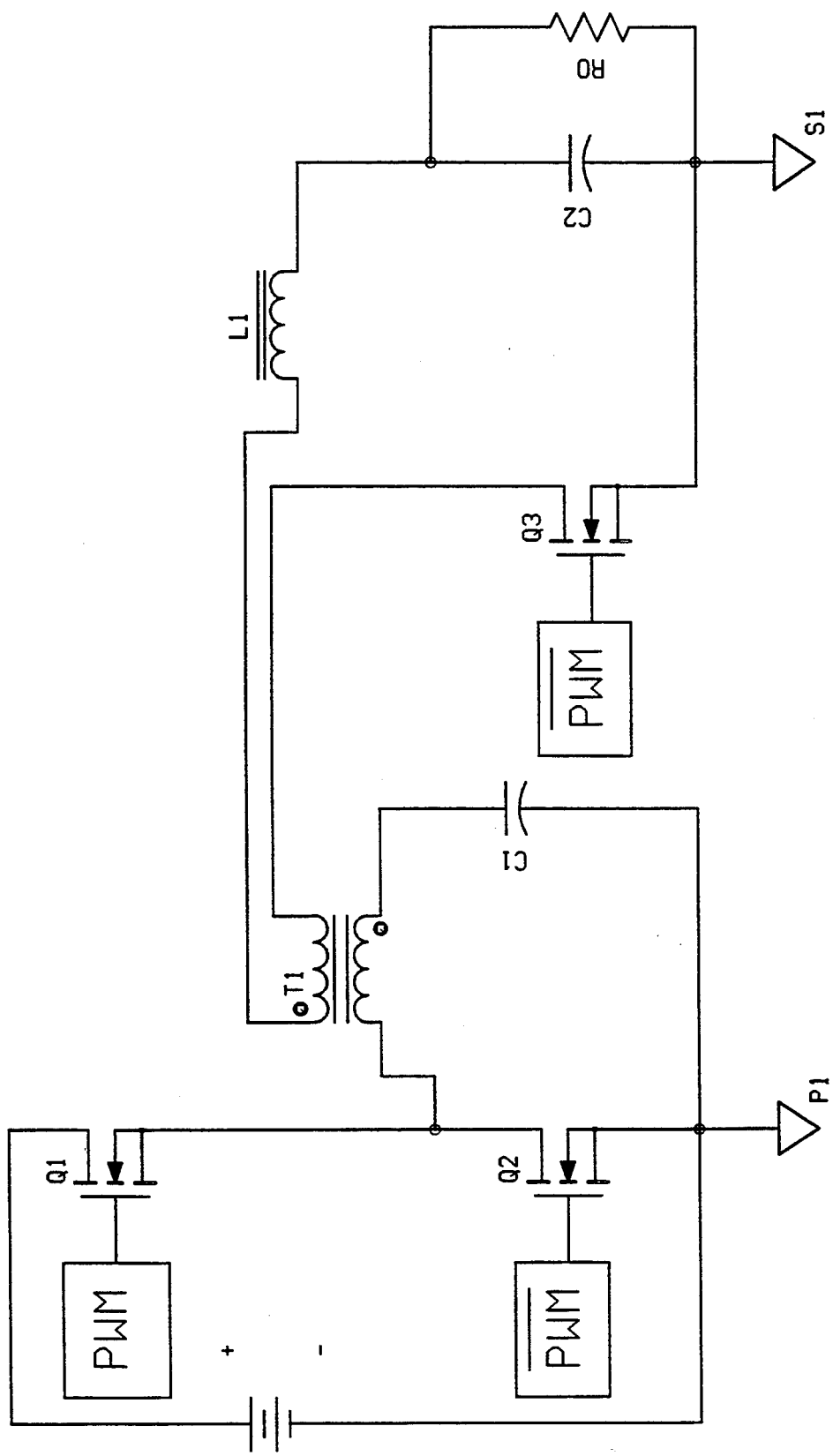
FIG. 10 illustrates another embodiment of the subject invention in which the series inductance is alternately placed in the secondary circuit.

A second embodiment in which inductor 216 is placed alternatively in series with the secondary winding of transformer 218, instead of in series with the primary winding of transformer 218, is illustrated in FIG. 10. The waveforms for the circuit illustrated in FIG. 10 are similar or identical to the first embodiment in almost every case. By placing the inductor in series with the secondary winding of transformer 218 and replacing $L_I$ by $n^2 L_I$, the analysis is identical, since an inductor in series with the secondary winding will have the same effect as an inductor $n^2$ times larger in series with the primary winding. In this embodiment the first zero voltage switching transition is driven solely by the stored energy in the transformer 218. This second embodiment appears as an obvious variation of the first embodiment to one skilled in the art of electronic circuit design.

The series inductance necessary to accomplish zero voltage switching was shown to be a lumped element placed in series with the primary winding as shown in FIG. 5 by inductor 216. An alternate arrangement in which the inductor is placed in series with the secondary winding is shown in FIG. 10. Another alternative includes placing one small inductor in series with the primary winding and a second small inductor in series with the secondary winding, so that the sum of the energies stored by the two inductors is sufficient to drive the resonant transition over the full ranges of line voltage and load current. This arrangement (not shown) is to be considered an embodiment of this invention.

Another alternative is to design the transformer such that the leakage inductance of the transformer contains sufficient energy to drive the resonant transition for all load conditions at maximum line voltage. This arrangement is also considered an embodiment of this invention. The idea of using leakage inductance may, at first glance, seem attractive because a separate circuit element is eliminated. Unfortunately, increasing the leakage inductance is, generally, considered undesirable by one who is skilled in the art of power converter design, because the leakage magnetic flux associated with the leakage inductance contributes to AC conduction losses due to eddy currents and proximity effects within the transformer. As discussed earlier, a series inductance which saturates or reduces its inductance value significantly, after storing the minimum energy required to drive the resonant transition, is desirable for the reasons discussed earlier. This option is not available when the leakage inductance of the transformer is used to provide the energy for the switching transition. There will inevitably be some leakage inductance in transformer 218. The effect of the leakage inductance is added series inductance and can be included as part of inductor 216 for purposes of analysis.

There are two other embodiments that are identical to the first two embodiments, except that switch 234 and capacitor 236 are eliminated in these new embodiments. The most significant difference between these embodiments and the first two embodiments is that the output voltage is reduced by the forward voltage drop of diode 222. Because of the forward voltage drop across the diode 222 the maximum efficiency achievable is reduced. The advantage of this arrangement is that the drive circuit required to drive switch 234 can be eliminated and the circuit is simpler and potentially lower in cost.

Another difference of these embodiments is that bidirectional power flow is no longer possible if the bidirectional secondary switch indicated in the first two embodiments is replaced by a diode rectifier. The use of the diode in place of the power mosfet results in a reduction of the effectiveness of the power converter in amplifier and inverter applications.

Additional embodiments are realized by adding converter outputs. Additional converter outputs can be realized by providing an additional secondary winding to transformer 218, an additional output filter capacitor, and an additional switch with an associated drive circuit or diode, for each additional converter output. For secondary side placement of the series inductor, series inductance must be added for each output. This fact represents a significant advantage of primary side placement of the series inductor for the case of multiple outputs.

Figure 11:
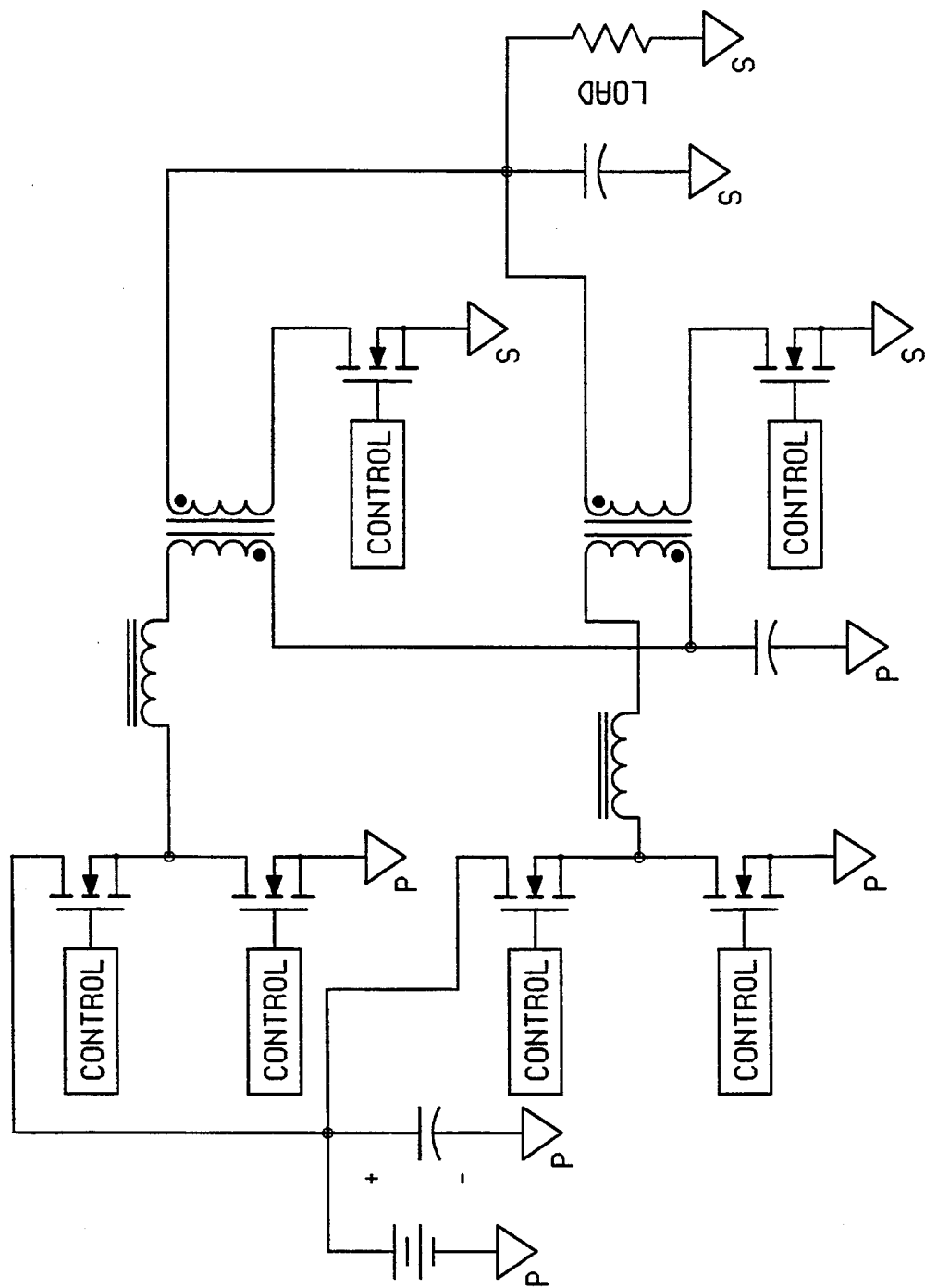
FIG. 11 illustrates a power converter system composed of two multi-phase, interleaved, power converters according to the subject invention.

FIG. 11 illustrates another embodiment in which two converters are operated in parallel but out of phase by 180 degrees. The two parallel, interleaved converters share input filter capacitors, primary filter capacitors, and output filter capacitors. There are many significant advantages to this interleaved, parallel, multi-phase approach. The most significant advantage of paralleling multi-phase converters is that the capacitor requirements for the combined converter are significantly reduced. The capacitor requirements are reduced because the interleaved AC currents from the two converters cancel to some extent. The DC currents add by superposition. The composite ripple current is at a frequency that is higher than the switching frequency of the converters that are combined to form the parallel converter system. In the case of two parallel converters, as shown in FIG. 11, the ripple frequency is twice the switching frequency. FIG. 11 illustrates a converter system with two interleaved parallel converters. Converter systems with any number of parallel converters differing in phase from each other and substantially identical to the two converters shown in FIG. 11 are considered embodiments of this invention.

Another embodiment is realized by removing capacitor 220 and placing an equivalent capacitor between node 213 and the undotted terminal of the primary winding of transformer 218. Except for turn on and turn off transients there are no significant operational differences between this embodiment with the alternate connection of capacitor 220 and the embodiment shown in FIG. 5.

Figure 20:
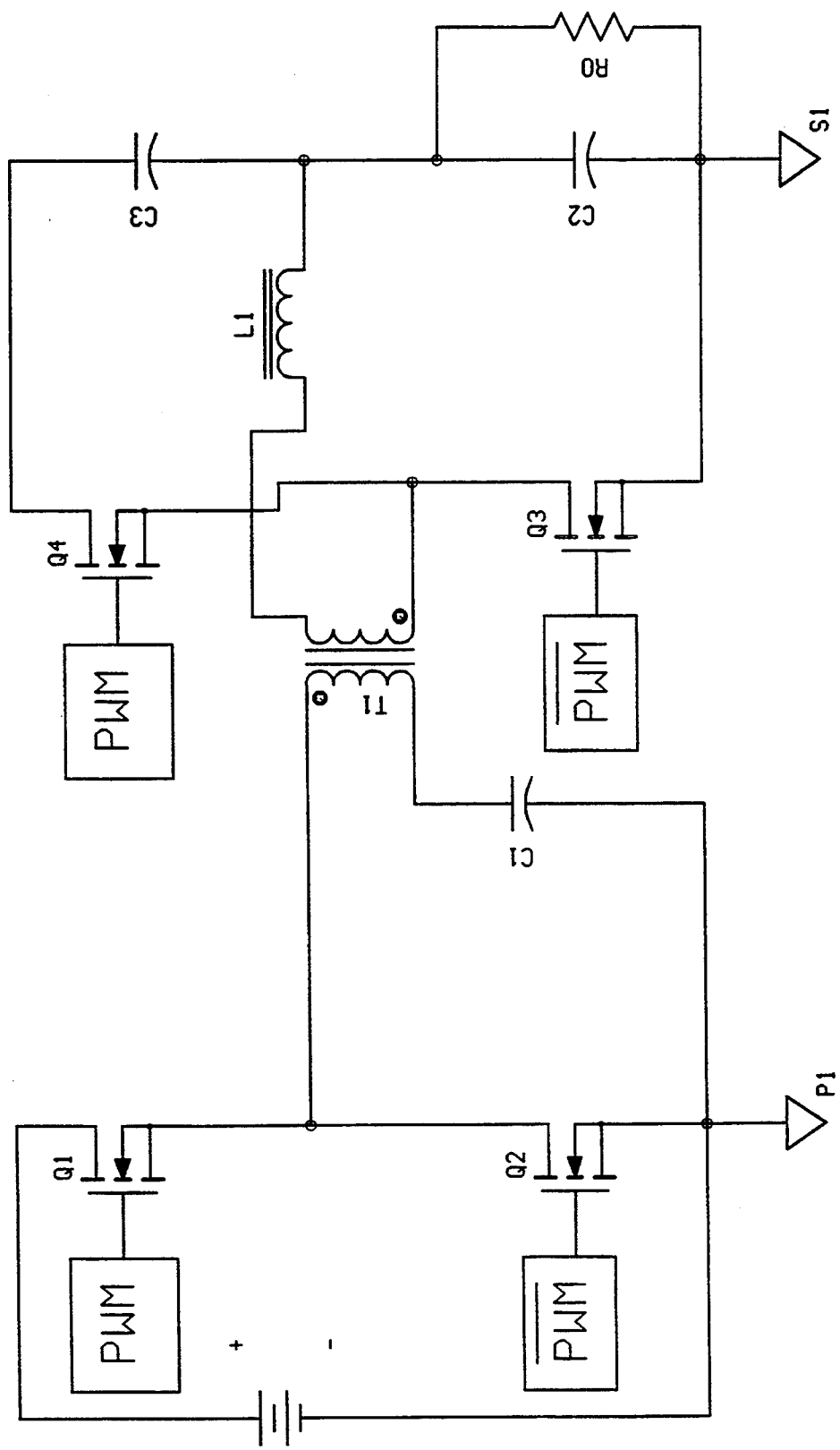
FIG. 20 illustrates a power converter based on the power converter of FIG. 5 which simultaneously accomplishes zero voltage switching and bidirectional power flow.

Another embodiment is illustrated in FIG. 20. This embodiment adds a second secondary switch and a second secondary capacitor. The circuit of FIG. 20, with a suitable control circuit and a driver for the fourth switch, will have the property of bidirectional power flow and can be made to accomplish zero voltage switching for all four switches for both directions of power flow. The circuit of FIG. 5 will have the property of bidirectional power flow but will not accomplish zero voltage switching, in general, when the power flow is from the secondary to the primary because the magnetizing current will have reversed direction. With the reversed magnetizing current, the turn on transition of the second primary switch, represented by switch 212 in FIG. 5, and the turn on transition of the first secondary switch, represented by switch 234 in FIG. 5, will not be zero voltage. The addition of the second secondary switch and the second secondary capacitor will enable the current in the secondary winding to reverse. The reversal of current enables the zero voltage transition for the secondary switches. When the secondary transition is complete and the first secondary switch is turned on, the primary circuit transition will be driven by the stored energy in the output filter capacitor.

Structure

Figure 12:
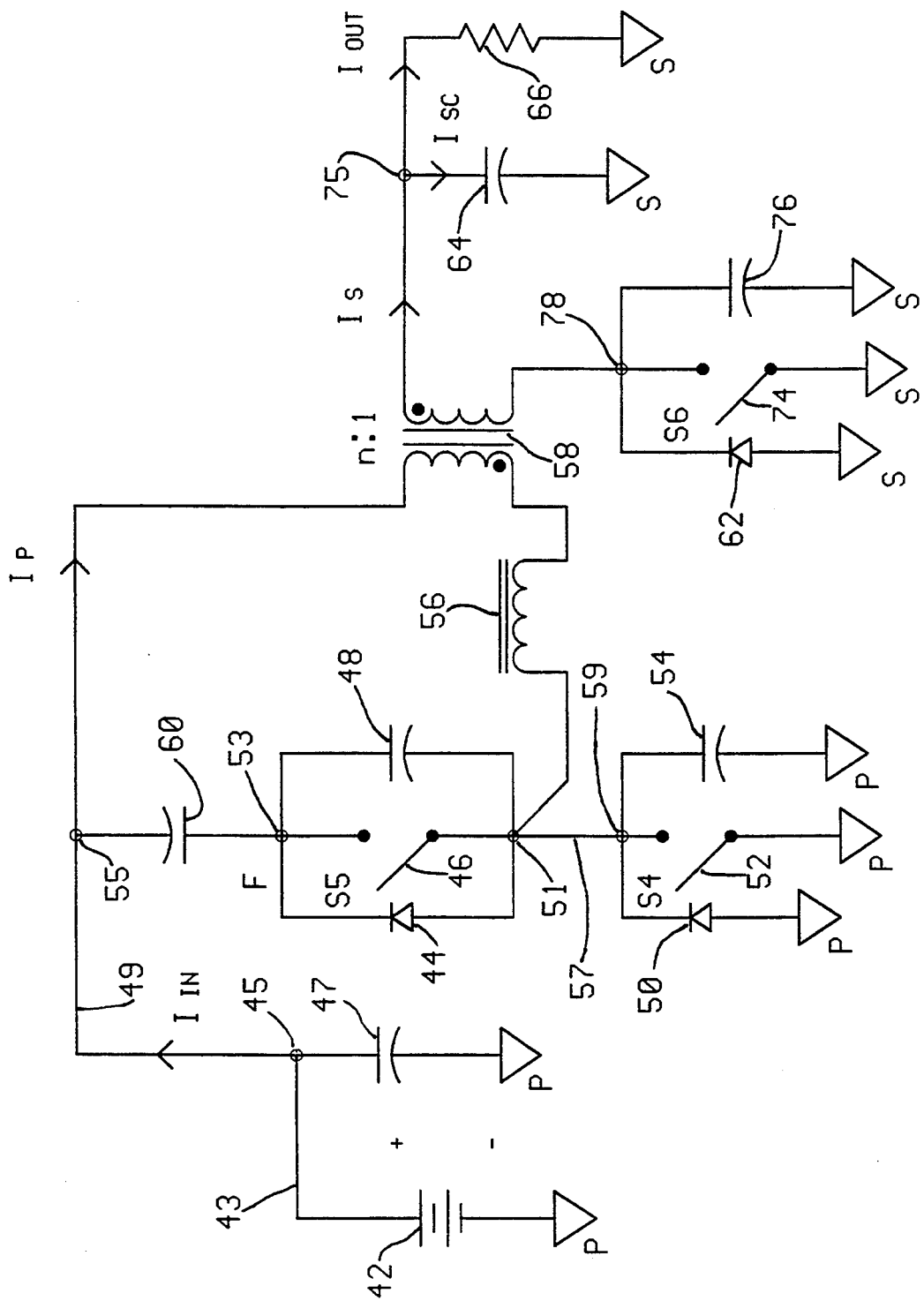
FIG. 12 illustrates a simple, constant frequency, pulse width modulated, zero voltage switching, isolated, boost derived, power converter according to the subject invention.

FIG. 12 shows a boost derived topology which is another embodiment of the subject invention. In this embodiment a DC input power source 42 is connected to a primary ground at a negative terminal of source 42. A positive second terminal of DC input power source 42 is connected to a lead 43. Lead 43 is also connected to a node 45. Node 45 is connected to a terminal of an input filter capacitor 47 and to a lead 49. A second terminal of capacitor 47 is connected to primary ground. Lead 49 connects to a node 55. Node 55 connects to a primary filter capacitor 60 and to an undotted terminal of a primary winding of a first inductive element or transformer 58. A node 53 connects to a second terminal of capacitor 60, to a cathode of a diode 44, to a switch 46, and to a capacitor 48. A node 51 connects to an anode of diode 44, to a second terminal of switch 46, to a second terminal of capacitor 48, to a lead 57, and to a magnetic energy storing means or inductor 56. A second terminal of inductor 56 is connected to a second dotted terminal of the primary winding of transformer 58. Lead 57 is connected to a node 59. Node 59 is connected to a cathode of a diode 50, to a switch 52, and to a capacitor 54. Diode 50, switch 52, and capacitor 54 form a first primary switch subcircuit. An anode of diode 50, a second terminal of switch 52, and a second terminal of capacitor 54 are all connected to primary ground. Diode 44, switch 46, and capacitor 48 form a second primary switch subcircuit.

A dotted terminal of a secondary winding of transformer 58 is connected to a node 75. Node 75 is also connected to an output filter capacitor 64 and to a load 66. A second undotted terminal of the secondary winding of transformer 58 is connected to a node 78. Node 78 is also connected a cathode of a diode 62, to a switch 74, and to a capacitor 76. Diode 62, switch 74, and capacitor 76 form a first secondary switch subcircuit. An anode of diode 62, a second terminal of switch 74, a second terminal of capacitor 76, a second terminal of output filter capacitor 64, and a second terminal of load 66 are all connected to a secondary ground.

Operation

Figure 14:
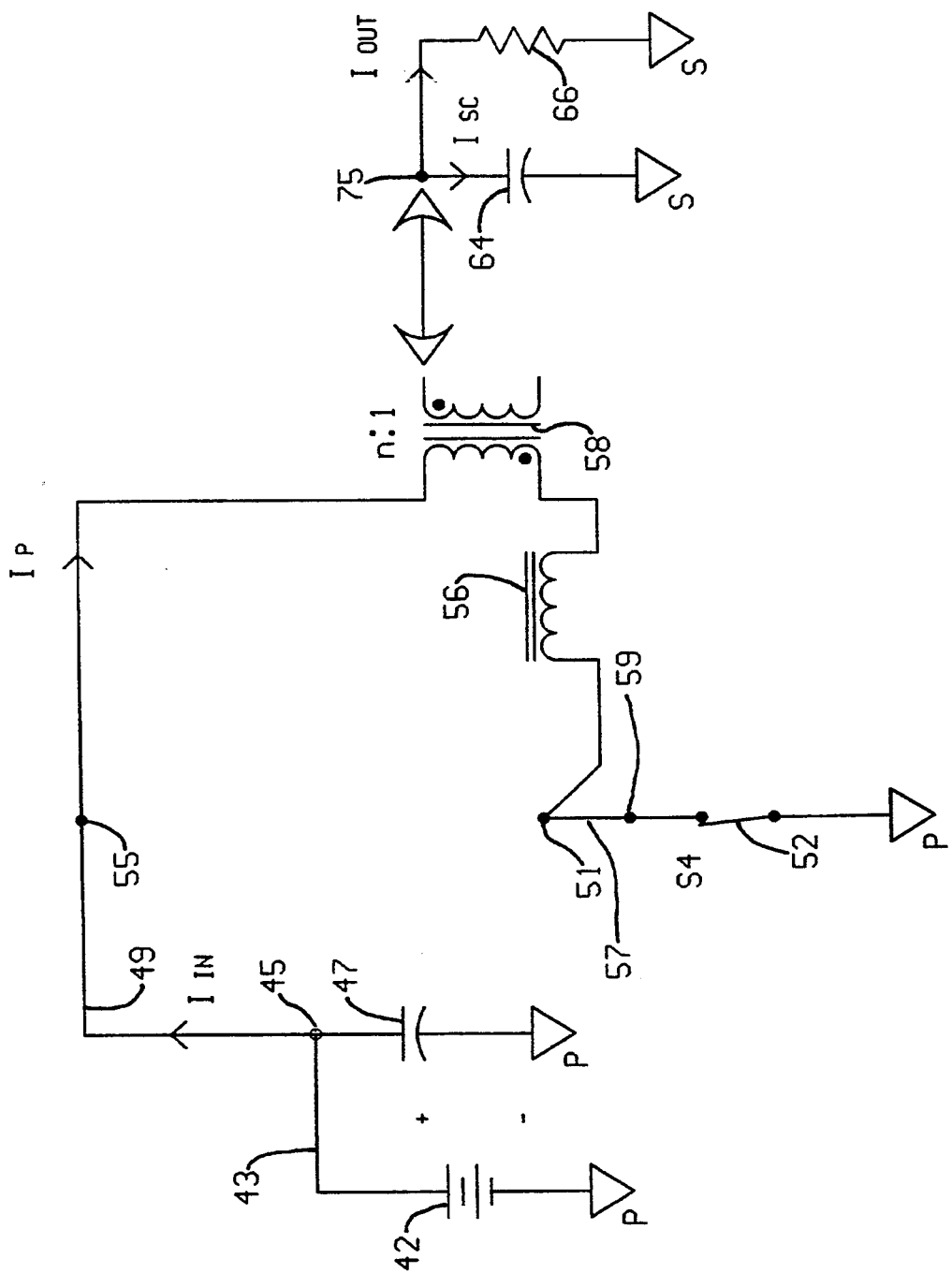
FIG. 14 illustrates the first operating state of the power converter of FIG. 12.
Figure 15:
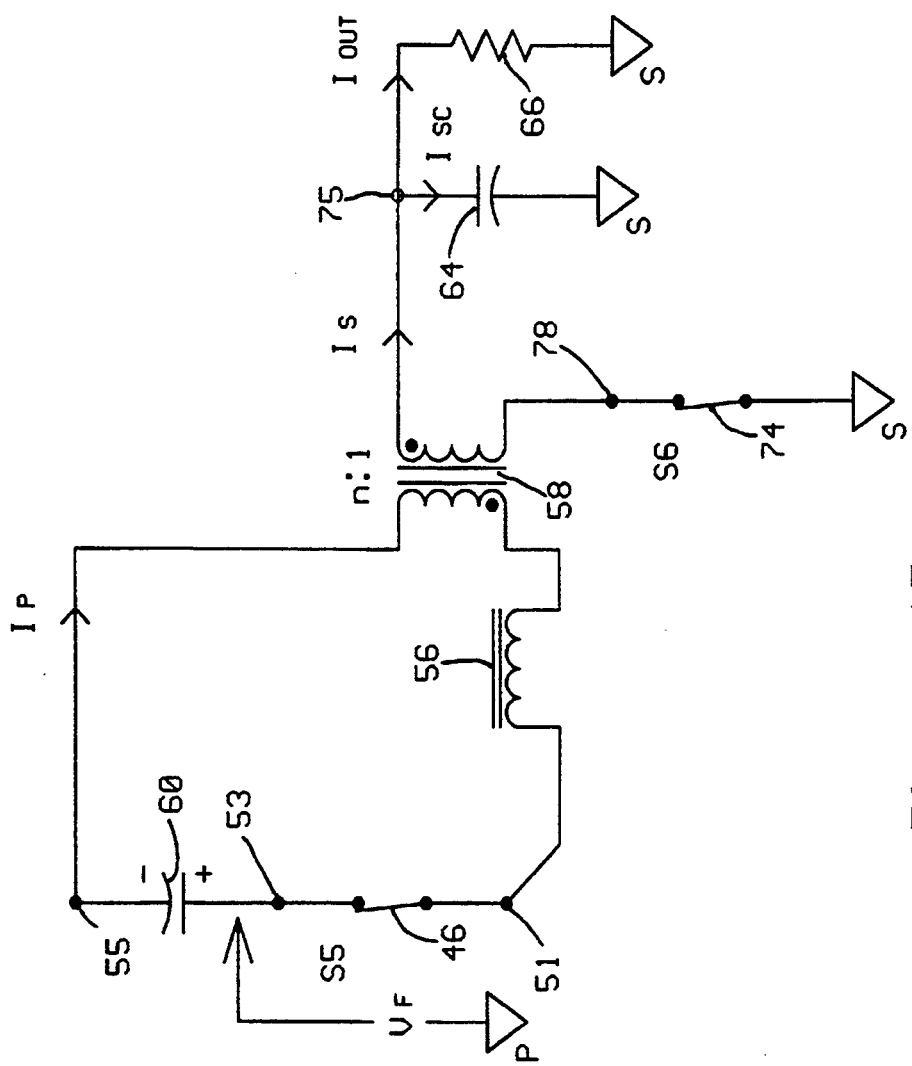
FIG. 15 illustrates the second operating state of the power converter of FIG. 12.

Waveforms illustrating the operation of the circuit of FIG. 12 are shown in FIG. 13. There are two operational states of FIG. 12, which are illustrated in FIGS. 14 and 15. In a first state, shown in FIG. 14, while switch 52 conducts, magnetizing current in the primary winding of transformer 58 increases linearly. During the first state capacitor 64 supports load 66.

In a second state, shown in FIG. 15, switches 46 and 74 are conducting. During the second operating state switch 52 is open and the magnetizing current in the primary winding of transformer 58 decreases. Decreasing primary current flows into capacitor 60 and then reverses approximately midway through the second state as current increases linearly in the secondary winding of transformer 58 which provides current to load 66 and capacitor 64.

In steady state the time average voltages impressed across the primary winding of transformer 58 and across inductor 56 must be zero. It can be shown that $$V_F = \frac{1}{1-D} V_{IN} \qquad (35)$$

where $V_F$ is the voltage at node 53 with respect to primary ground.

By an analysis analogous to the analysis described for the first embodiment it can be shown that $$V_{OUT} = \left(\frac{\alpha}{\alpha+1}\right)\frac{DV_{IN}}{n(1-D)} \qquad (36)$$

where D is the duty cycle of switch 52, $V_{IN}$ is the DC input voltage, n is the turns ratio of transformer 58, and $\alpha$ is defined in equation (12).

Although this converter has the structure of a boost derived converter the transfer function is that of a buck boost derived converter. This is explained by the fact that the voltage impressed on inductor 56 and the primary winding of transformer 58 while the secondary circuit is conducting is not $V_F$ but rather $V_F - V_{IN}$.

The secondary current waveforms are substantially identical to those of the first embodiment. The relationships that determine the primary currents are, however, somewhat different in the embodiment of FIG. 12.

The peak-to-peak AC magnetizing current in the primary of transformer 58, $I_{MPP}$, can be shown to be $$I_{MPP} = \frac{V_{IN}DT}{L_I + L_P} \qquad (37)$$

where T is the switching period, $L_I$ is the inductance of inductor 56, and $L_P$ is the open circuit inductance of the primary winding of transformer 58.

The total peak-to-peak primary current in transformer 58, $I_{PP}$, can be shown to be $$I_{PP} = I_{MPP} + I_{RPP}$$

where $I_{RPP}$ is the peak-to-peak current in the primary winding of transformer 58 reflected from the secondary current.

$I_{RPP}$ can be shown to be $$I_{RPP} = \left[\frac{\frac{DV_{IN}}{1-D} - nV_{OUT}}{L_I}\right](1-D)T \qquad (38)$$

Because of the transfer function which implies a wide dynamic range, the high switching efficiency, and low core losses of the subject invention, the embodiment shown in FIG. 12 has considerable merit as a line voltage power factor correction circuit.

The mechanism, criteria, and analysis for zero voltage resonant transition switching for the embodiment of FIG. 12 are identical to the mechanism, criteria, and analysis for the embodiment of FIG. 5, except that the transition voltage is $V_F$ for the FIG. 12 embodiment and the transition voltage was $V_{IN}$ for the FIG. 5 embodiment.

Related Embodiments

More embodiments of the subject invention are realized by extending the FIG. 12 embodiment in the same ways that the FIG. 5 embodiment was extended. One embodiment is realized by alternately placing inductor 56 in series with the secondary winding of transformer 58 instead of in series with the primary winding of the transformer 58. Another embodiment is realized by adding secondary windings and circuits to the FIG. 12 circuit to extend the concept to multiple outputs. Another embodiment is realized by paralleling interleaved multi-phase converters of the type shown in FIG. 12 which share input filter capacitors, primary filter capacitors, and output filter capacitors. Another embodiment is realized by removing secondary switch 74 and capacitor 76.

Figure 21:
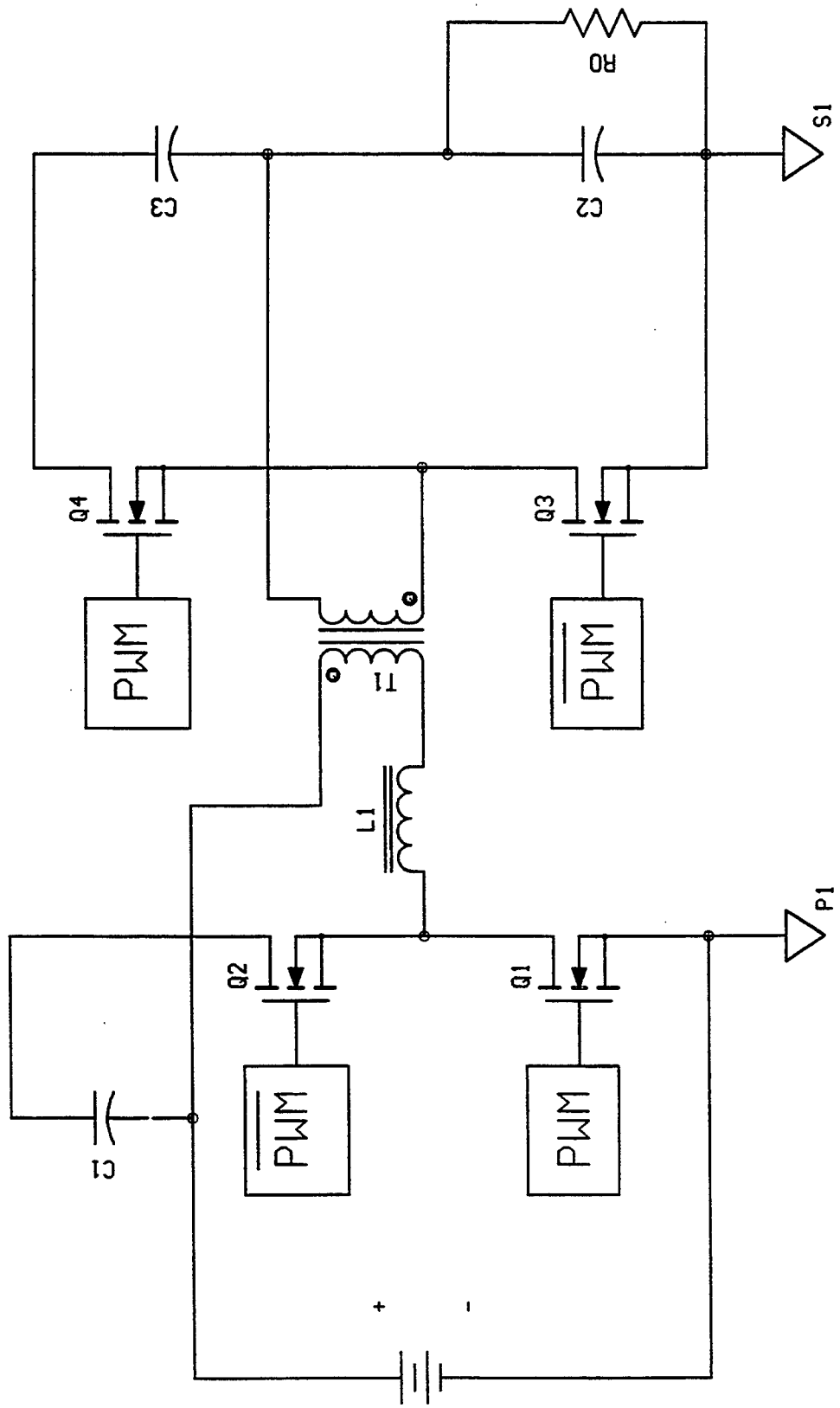
FIG. 21 illustrates a power converter based on the power converter of FIG. 12 which simultaneously accomplishes zero voltage switching and bidirectional power flow.

Another embodiment is illustrated in FIG. 21. This embodiment adds a second secondary switch and a second secondary capacitor. The circuit of FIG. 21, with a suitable control circuit and a driver for the fourth switch, will have the property of bidirectional power flow and can be made to accomplish zero voltage switching for all four switches for both directions of power flow. The circuit of FIG. 12 will have the property of bidirectional power flow but will not accomplish zero voltage switching, in general, when the power flow is from the secondary to the primary because the magnetizing current will have reversed direction. With the reversed magnetizing current, the turn on transition of the second primary switch, represented by switch 52 in FIG. 12, and the turn on transition of the first secondary switch, represented by switch 74 in FIG. 12, will not be zero voltage. The addition of the second secondary switch and the second secondary capacitor will enable the current in the secondary winding to reverse. The reversal of current enables the zero voltage transition for the secondary switches. When the secondary transition is complete and the first secondary switch is turned on, the primary circuit transition will be driven by the stored energy in the output filter capacitor.

Structure

Figure 16:
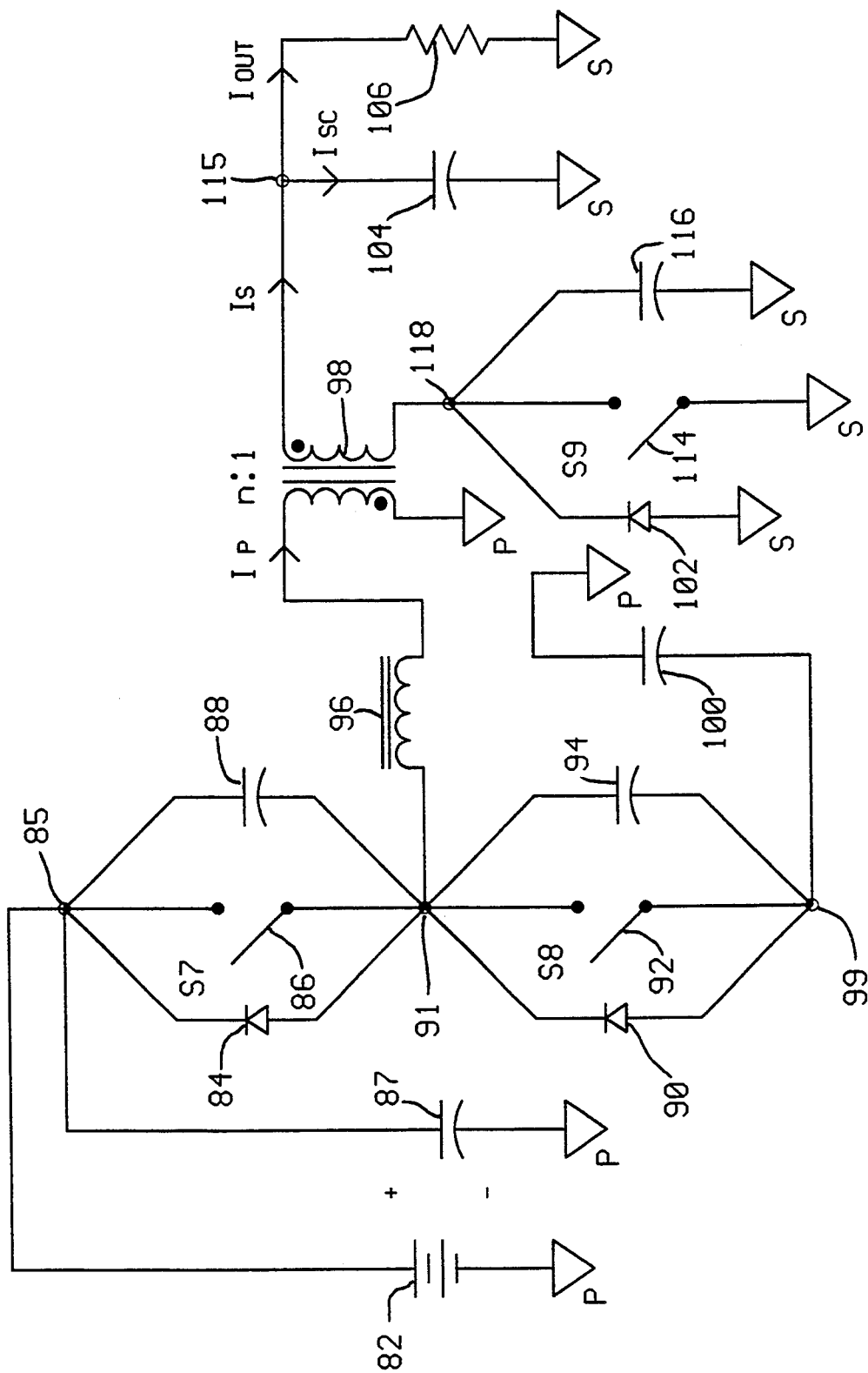
FIG. 16 illustrates a simple, constant frequency, pulse width modulated, zero voltage switching, isolated, buck boost derived, power converter according to the subject invention.

FIG. 16 shows a buck boost derived topology which is another embodiment of the subject invention. This embodiment is very similar to the embodiment of FIG. 12. The FIG. 16 embodiment is effectively a rearrangement of the FIG. 12 circuit with no basic functional differences. The most significant difference is that the FIG. 16 circuit uses a high side first primary switch. In this embodiment a DC input power source 82 is connected to a primary ground at a negative terminal of the source 82. A positive second terminal of DC input power source 82 is connected to a capacitor 87, to a cathode of a diode 84, to a switch 86, and to a capacitor 88. Diode 84, switch 86, and capacitor 88 form a first primary switch subcircuit. A node 91 is connected to an anode of diode 84, to a second terminal of switch 86, to a second terminal of capacitor 88, to a magnetic energy storing means or inductor 96, to the cathode of a diode 90, to a switch 92, and to a capacitor 94. A node 99 is connected to an anode of diode 90, to a second terminal of switch 92, to a second terminal of capacitor 94, and to a primary filter capacitor 100. Diode 90, switch 92 and capacitor 94 form a second primary switch subcircuit. A second terminal of inductor 96 is connected to an undotted terminal of a primary winding of a first inductive element or transformer 98. The primary ground is connected to a second terminal of capacitor 100 and to a second dotted terminal of the primary winding of transformer 98. A dotted terminal of a secondary winding of transformer 98 is connected to a node 115. The node 115 is connected to an output filter capacitor 104 and to a load 106. A second undotted terminal of the secondary winding of transformer 98 is connected to a node 118. Node 118 is connected to a cathode of a diode 102, to a switch 114, and to a capacitor 116. Diode 102, switch 114, and capacitor 116 form a first secondary switch subcircuit. A secondary ground is connected to an anode of diode 102, to a second terminal of switch 114, to a second terminal of capacitor 116, to a second terminal of capacitor 104, and to a second terminal of load 106.

Operation

Figure 18:
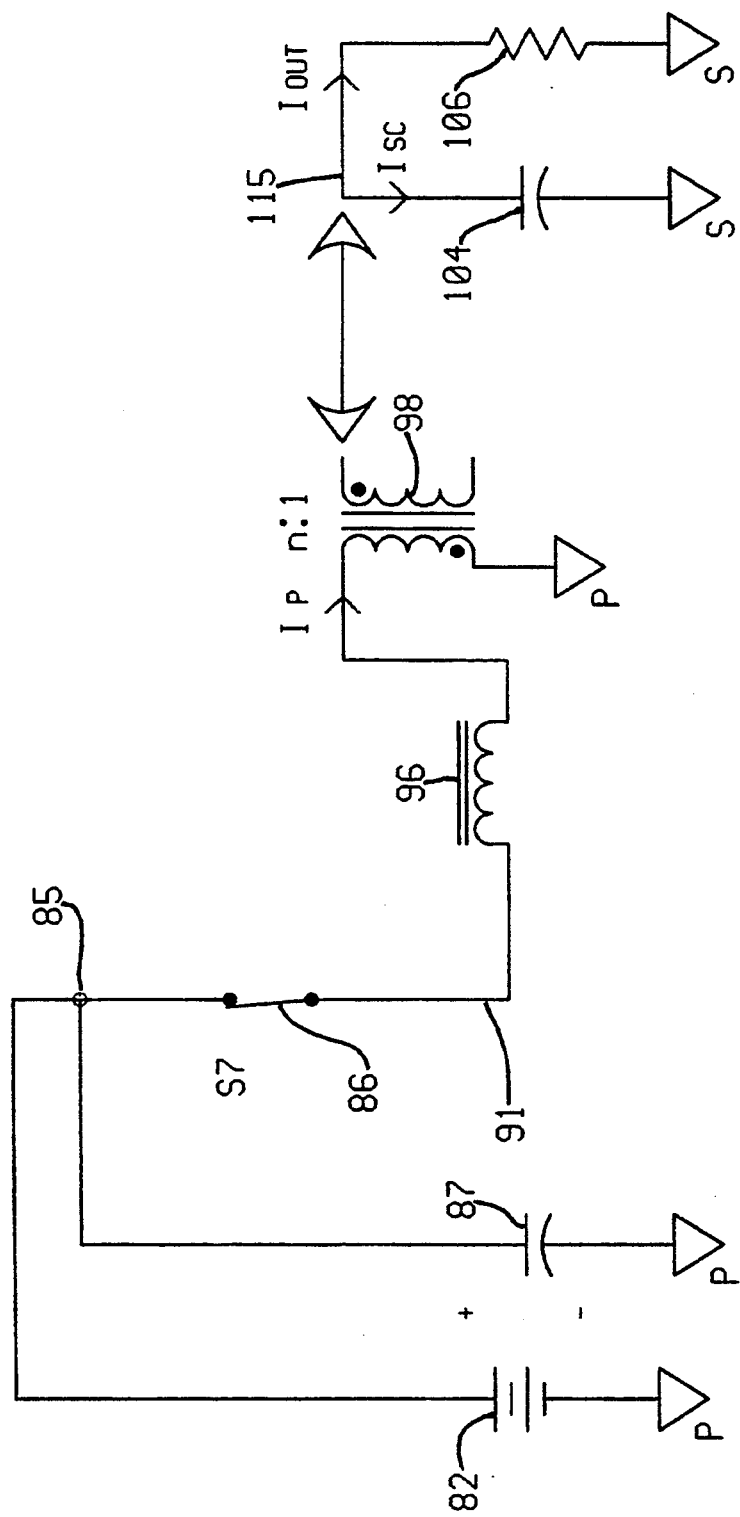
FIG. 18 illustrates the first operating state of the power converter of FIG. 16.
Figure 19:
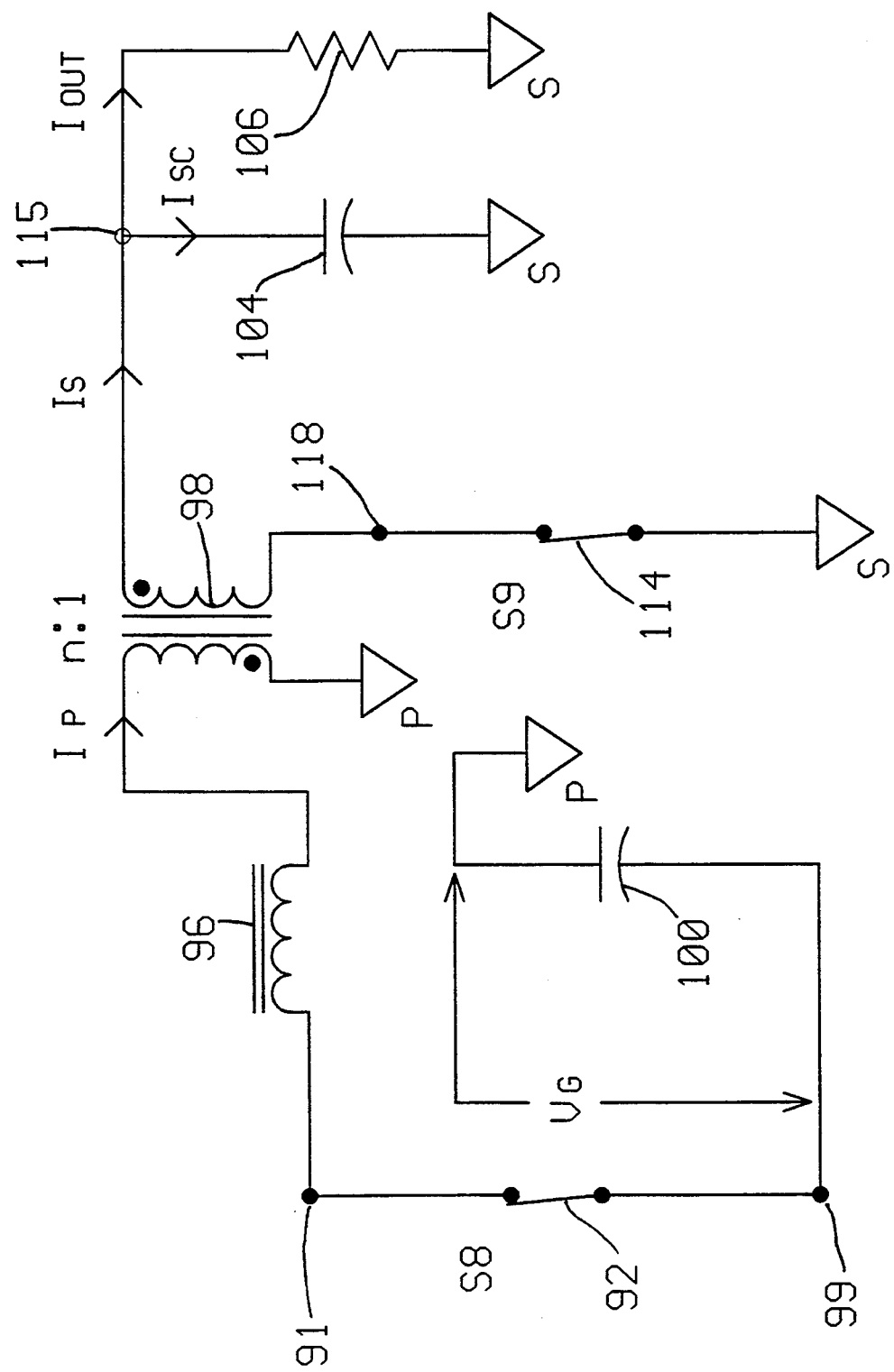
FIG. 19 illustrates the second operating state of the power converter of FIG. 16.

The waveforms are similar to the waveforms for the circuits of FIGS. 5 and 12 and are illustrated in FIG. 17. The operation of the circuit of FIG. 16 is substantially identical to the operation of the circuit of FIG. 12. There are two operational states of the FIG. 16 circuit which are illustrated in FIGS. 18 and 19. In a first state shown in FIG. 18 switch 86 is on allowing current to flow from source 82 through switch 86, through inductor 96, and through the primary winding of transformer 98 to primary ground. During the first state switch 92 and switch 114 are open. The load is supported by capacitor 104 during the first state.

In FIG. 19 a second state is illustrated in which switch 86 is off and switches 92 and 114 are both on. Current in the primary loop consisting of capacitor 100, switch 92, inductor 96 and the primary winding of transformer 98 first flows clockwise in the loop and decreases linearly, reverses direction approximately midway though the second state, and increases in the counter clockwise direction at the same rate for the remainder of the interval. During the second state the secondary current begins at zero and ramps up linearly to a peak at the end of the interval. The secondary current flows clockwise from the secondary ground through switch 114, through the secondary winding of transformer 98 to capacitor 104 and load 106.

Based on an analysis similar to the analyses performed for the FIG. 5 and FIG. 12 circuits, it can be shown that $$V_G = \frac{D}{1-D} V_{IN}$$

where $V_G$ is the voltage at node 99 with respect to primary ground, and $$V_{OUT} = \left(\frac{\alpha}{\alpha+1}\right) \frac{DV_{IN}}{n(1-D)}$$

which is the same result as for the circuit of FIG. 12.

The equations developed to describe the currents are the same for the FIG. 16 power converter as they were for the FIG. 12 power converter.

The mechanism, criteria, and analysis for zero voltage resonant transition switching for the embodiment of FIG. 16 is identical to the mechanism, criteria, and analysis for the embodiment of FIG. 5 except that the transition voltage is $V_G + V_{IN}$ for the FIG. 16 embodiment and the transition voltage was $V_{IN}$ for the FIG. 5 embodiment.

Related Embodiments

Additional embodiments of the power converter shown in FIG. 16 are realized by extending and altering the FIG. 16 embodiment in the same ways that the FIG. 5 embodiment was extended and altered.

Conclusion, Ramifications, and Scope of Invention

Thus the reader will see that the power converters of the invention provide a mechanism which significantly reduces switching losses, have low component parts counts, and do not require high core losses or high conduction losses to accomplish zero voltage switching.

While my above description contains many specificities, these should not be construed as limitations on the scope of the invention, but rather as exemplifications of preferred embodiments thereof. Many other variations are possible. For example, other variations include power converters with more than one output; multiphase, interleaved, parallel power converters with three or more parallel converter sections; power converters arranged in a bridged configuration for amplifier and inverter applications; power converters similar to those shown in the drawing but which integrate individual magnetic circuit elements onto a single magnetic core; power converters similar to those shown but which have instead high AC ripple voltages on the filter capacitors; power converters similar to those shown in the drawing but where the DC input source is instead a varying rectified AC signal as for the case of a power factor correction power converter. Accordingly, the scope of the invention should be determined not by the embodiments illustrated, but by the appended claims and their legal equivalents.

I claim:

1. A power converter comprising:
an input coupleable to a source of DC potential,
an output coupleable to a DC load,
a first coupled inductive element with substantial DC energy storage capability having a primary winding coupled to said input and a secondary winding coupled to said output,
a second inductive element connected in series with said first coupled inductive element,
a first capacitor coupled to said input and said primary winding,
a second capacitor coupled to said secondary winding and said output,
first switch means for coupling said first capacitor to said primary winding for exchanging stored energy between said first capacitor and said first coupled inductive element,
second switch means operable substantially in synchronization with said first switch means and coupled to said secondary winding for applying at least a portion of said exchanged energy to said DC load,
third switch means operable for coupling said primary winding to said source of DC potential alternately and sequentially with the operation of said first and second switch means, so that said first capacitor exchanges energy with said primary winding when said first switch means is activated, and said second capacitor exchanges energy with said secondary winding when said second switch means is activated, and
control means for selectively activating said first, second, and third switch means, such that said switches are operated when the voltage drop therethrough is substantially zero, said third switch means being operable in opposition to said first and second switch means, whereby said second inductive element contributes energy to the turn on transition of said third switch means in opposition to the energy stored in said first coupled inductive element accomplishing turn on of said third switch means at substantially zero voltage for the condition in which the peak to peak AC magnetizing current in the primary winding of said first coupled inductive element is less than twice the average magnetizing current in the primary winding of said first coupled inductive element.

2. A power converter as set forth in claim 1, wherein said second inductive element is saturable.

3. A power converter as set forth in claim 2, wherein said first capacitor is coupled in series with said primary winding, charged through said primary winding from said source of DC potential when said third switch means is closed, and discharged through said primary winding when said first switch means is closed.

4. A power converter as set forth in claim 3, wherein said second capacitor is coupled in series with said secondary winding and said second switch means, charged when said second switch means is closed, and discharged when said second switch means is open.

5. A power converter as set forth in claim 4, wherein said first, second, and third switch means comprise semiconductor means.

6. A power converter as set forth in claim 5, wherein said semiconductor means comprises a field effect transistor.

7. A power converter as set forth in claim 6, wherein said first switch means and said first capacitor have a common connection to said source of DC potential.

8. A power converter as set forth in claim 7, wherein said second capacitor and said secondary winding have a common connection to said output.

9. A power converter as set forth in claim 8, wherein said secondary winding and said second switch means have a common connection.

10. A power converter, comprising:
a first coupled inductor with substantial DC energy storage capability having a primary winding and a secondary winding,
a second coupled inductor with substantial DC energy storage capability having a primary winding and a secondary winding,
an input for coupling said primary windings of said first and second coupled inductors to a DC power source,
an output for coupling said secondary windings of said first and second coupled inductors to a DC load,
a third inductor to be connected in series with said first coupled inductor,
a fourth inductor to be connected in series with said second coupled inductor,
a first capacitor coupled to said input and to said primary windings of said first and second coupled inductors for storing electrical energy,
a second capacitor coupled to said output and to said secondary windings of said first and second coupled inductors for storing electrical energy,
switch means for selectively coupling said primary windings to said first capacitor and to said input and for selectively coupling said secondary windings to said second capacitor and to said output to enable the transmission of energy from said input to said output and to and from said capacitors and to and from said inductors, and
control means for selectively activating said switch means such that said switch means is turned on and turned off when the voltage therefrom is substantially zero, and for synchronously coupling said primary windings of said first or second coupled inductors to said power source and said first capacitor and for synchronously and alternately coupling said secondary windings of said first and second coupled inductors to said second capacitor and said output, whereby said third and fourth inductors contribute energy to the switching transitions of said switch means both in addition to and in opposition to the energy stored in said coupled inductors accomplishing turn on and turn off of all switch means at substantially zero voltage for the condition in which the peak to peak AC magnetizing current in each of said primary windings is less than twice the average magnetizing current in each of said primary windings of said coupled inductors.

11. A power converter as set forth in claim 10, wherein said third and fourth inductors are saturable.

* * * * *